United States Patent
Sun et al.

(10) Patent No.: US 9,848,349 B2
(45) Date of Patent: Dec. 19, 2017

(54) SYSTEM AND METHOD FOR MEASURING AND REPORTING UPLINK CHANNEL CONDITION

(75) Inventors: Yishen Sun, Buffalo Grove, IL (US); Hao Bi, Lake Zurich, IL (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 586 days.

(21) Appl. No.: 13/560,224

(22) Filed: Jul. 27, 2012

(65) Prior Publication Data

US 2013/0028120 A1    Jan. 31, 2013

Related U.S. Application Data

(60) Provisional application No. 61/512,710, filed on Jul. 28, 2011.

(51) Int. Cl.
H04W 4/00 (2009.01)
H04W 24/10 (2009.01)
H04W 24/02 (2009.01)

(52) U.S. Cl.
CPC ........... *H04W 24/10* (2013.01); *H04W 24/02* (2013.01)

(58) Field of Classification Search
CPC ..... H04W 24/02; H04W 24/10; H04W 36/30; H04W 72/1205
USPC ........................ 370/252, 328, 329
See application file for complete search history.

(56) References Cited

U.S. PATENT DOCUMENTS

| 7,983,674 B2 | 7/2011 | Julian et al. | |
| 2006/0104232 A1* | 5/2006 | Gidwani | H04W 28/18 370/328 |
| 2006/0286996 A1 | 12/2006 | Julian et al. | |
| 2008/0151797 A1 | 6/2008 | Camp | |
| 2008/0240013 A1 | 10/2008 | Johnson et al. | |
| 2009/0131069 A1 | 5/2009 | Wu et al. | |
| 2009/0238090 A1 | 9/2009 | Sambhwani et al. | |
| 2010/0105390 A1* | 4/2010 | Ishii | 455/436 |
| 2010/0242103 A1 | 9/2010 | Richardson et al. | |
| 2010/0322145 A1* | 12/2010 | Yu | H04B 7/155 370/315 |
| 2012/0046026 A1* | 2/2012 | Chande | H04W 24/10 455/422.1 |

(Continued)

FOREIGN PATENT DOCUMENTS

| CN | 101233775 A | 7/2008 |
| CN | 101584128 A | 11/2009 |
| WO | WO 2010-107354 A1 | 9/2010 |

OTHER PUBLICATIONS

LG Electronics, et al., "Way forward on SRS power Control," 3GPP TSG RAN WG1 #68bis, R1-121859, Agenda Item 7.5.6.2, Jeju, Korea, Mar. 26-30, 2012, 2 pages.

(Continued)

*Primary Examiner* — Charles C Jiang
*Assistant Examiner* — Ryan Kavleski
(74) *Attorney, Agent, or Firm* — Slater Matsil, LLP

(57) ABSTRACT

A method for reporting channel condition includes receiving an initial configuration identifying a group of assessment devices, and determining a channel condition for each communications channel between one of the assessment devices and the transmission point. The method also includes comparing each of the channel conditions with a first threshold, and transmitting a report to a network entity if at least one of the channel conditions meets the first threshold.

38 Claims, 8 Drawing Sheets

(56) References Cited

U.S. PATENT DOCUMENTS

| | | | | |
|---|---|---|---|---|
| 2012/0057535 A1* | 3/2012 | Zhang | ............... | H04W 72/0426 370/329 |
| 2012/0127908 A1* | 5/2012 | Gao | .................... | H04W 72/042 370/312 |
| 2012/0252462 A1* | 10/2012 | Fahldieck | ............. | H04W 36/32 455/438 |
| 2012/0282934 A1* | 11/2012 | Simonsson | ........... | H04W 72/12 455/446 |
| 2012/0307639 A1* | 12/2012 | Zirwas | .................. | H04W 28/08 370/236 |
| 2013/0003591 A1* | 1/2013 | Novak et al. | .................. | 370/252 |

OTHER PUBLICATIONS

International Search Report and Written Opinion of Patent Cooperation Treaty (PCT), International Application No. PCT/US12/48681, dated Nov. 16, 2012, 10 pages.

"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814, V9.0.0, Technical Report, Mar. 2010, 104 pages.

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.2.0, Technical Specification, Jun. 2011, 294 pages.

"3rd Generation Partnership Project; Technical Specification Group Radio Access Network; Coordinated Multi-Point Operation for LTE Physical Layer Aspects (Release 11)," 3GPP TR 36.819, V1.0.0, Technical Report, May 2011, 55 pages.

Chinese Office Action received in Application No. 201280037817.5 dated Apr. 30, 2015, 8 pages.

Chinese Search Report received in Application No. 201280037817.5 dated Apr. 20, 2015, 2 pages.

* cited by examiner

SYSTEM AND METHOD FOR MEASURING AND REPORTING UPLINK CHANNEL CONDITION

This application claims the benefit of U.S. Provisional Application No. 61/512,710, filed on Jul. 28, 2011, entitled "System and Method for Measuring and Reporting Uplink Channel Condition," which application is hereby incorporated herein by reference.

TECHNICAL FIELD

The present disclosure relates generally to digital communications, and more particularly to a system and method for measuring and reporting uplink channel condition.

BACKGROUND

In order to achieve better channel utilization and increase overall performance, multiple transmission and multiple reception antennas (also commonly referred to as multiple input, multiple output (MIMO)) at both evolved Node B (eNB) (or base station (BS), Node B (NB), communications controller, and the like) and User Equipment (UE) (or mobile station (MS), terminal, user, subscriber, subscriber equipment, mobile device, and the like) are considered.

An extension to MIMO makes use of multiple communications points (each of which may be a set of geographically co-located transmit or receive antennas) to transmit to or receive from a single UE or a group of UEs. As an example, the transmissions from the multiple transmission points may occur at the same time and/or the same frequency, or they may occur at different times and/or at different frequencies so that the UE (or the group of UEs) will receive transmissions from all of the multiple transmission points over a time window. This operating mode may often be referred to as multiple point transmission. As an example, at a first time, a first transmission point may transmit to a UE, at a second time, a second transmission point may transmit to the UE, and so on. Here the second time may or may not be the same as the first time.

Similarly, receptions from a single transmission point may occur at the same time and/or the same frequency, or they may occur at different times and/or at different frequencies so that multiple reception points will receive the transmissions from the transmission point over a time window. This operation mode may often be referred to as multiple point reception. As an example, at a first time, the transmission point may transmit to a first eNB, at a second time, the transmission point may transmit to a second eNB, and so on. Here, the second time may or may not be the same as the first time.

Coordinated multiple point (CoMP) reception is one form of multiple point reception, wherein the receptions of the transmissions made by the transmission point are coordinated so that the reception points may be able to either combine the multiple receptions from the transmission point or avoid interference to improve overall performance. A reception point may be an eNB, a part of an eNB (e.g., a cell), a remote radio head (RRH) connected to an eNB, and the like. It is noted that sectors of the same site, e.g., an eNB, correspond to different reception points.

CoMP transmission and reception is being considered for inclusion in next generation wireless communications systems, such as in Third Generation Partnership Project (3GPP) Long Term Evolution (LTE) Advanced standards compliant communications systems, as a tool to improve the coverage of high data rates, to improve cell-edge throughput, and/or to increase overall communications system throughput in both high load and low load scenarios.

SUMMARY OF THE DISCLOSURE

Example embodiments of the present disclosure which provide a system and method for measuring and reporting uplink channel condition.

In accordance with an example embodiment of the present disclosure, a method for reporting channel condition is provided. The method includes receiving an initial configuration identifying a group of assessment devices, and determining a channel condition for each communications channel between one of the assessment devices and the transmission point. The method also includes comparing each of the channel conditions with a first threshold, and transmitting a report to a network entity if at least one of the channel conditions meets the first threshold.

In accordance with another example embodiment of the present disclosure, a method for configuring a group of receiving devices is provided. The method includes transmitting an initial configuration identifying a group of assessment devices to a transmission point, and receiving a report from the transmission point, the report comprising a channel condition for at least one of the assessment devices in the group of assessment devices. The method also includes adjusting the group of receiving devices in accordance with the report to produce an updated group of receiving devices.

In accordance with another example embodiment of the present disclosure, a method for configuring a group of receiving devices is provided. The method includes determining a first channel condition for a first communications channel between a first assessment device and a transmission point, wherein the first channel condition is determined in accordance with a reference signal transmitted by the transmission point, and receiving a second channel condition from a second assessment device for a second communications channel between the second assessment device and the transmission point, wherein the second channel condition is determined in accordance with the reference signal transmitted by the transmission point. The method also includes adjusting a group of receiving devices in accordance with the first channel condition and the second channel condition to produce an updated group of receiving devices.

In accordance with another example embodiment of the present disclosure, a transmission point is provided. The transmission point includes a receiver, a processor operatively coupled to the receiver, and a transmitter operatively coupled to the processor. The receiver receives an initial configuration identifying a group of assessment devices. The processor determines a channel condition for each communications channel between one of the assessment devices in the group of assessment devices and the transmission point, and compares each of the channel conditions with a first threshold. The transmitter transmits a report to a network entity if at least one of the channel conditions meets the first threshold.

In accordance with another example embodiment of the present disclosure, a network entity is provided. The network entity includes a transmitter, a receiver, and a processor operatively coupled to the transmitter and to the receiver. The transmitter transmits an initial configuration identifying a group of assessment devices to a transmission point. The receiver receives a report from the transmission point, the report comprising a channel condition for at least one of the assessment devices in the group of assessment devices. The processor adjusts a group of receiving devices in accordance with the report to produce an updated group of receiving devices.

One advantage of an embodiment is that example embodiments provide techniques for selecting multiple point sets with minimized power consumption, operation overhead, and the like, while maintaining reliable data reception at a network side.

A further advantage of an embodiment is that example embodiments provide techniques for dynamic selection of a major point, which may help to improve overall communications performance in a changing environment.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to measuring and reporting uplink channel condition. For example, a transmission point measures channel conditions for communications channels between itself and assessment devices in a group of assessment devices. The transmission point compares the channel conditions against a threshold and reports the channel conditions if one or more channel conditions meet the threshold. For example, a network entity identifies a group of assessment devices and a group of receiving devices of a transmission point, informs the transmission point of the group of assessment devices, and receives a report from the transmission point. The report includes a path loss of a channel for at least one of the assessment devices, and the network entity adjusts the group of assessment devices and the group of receiving devices according to the report as necessary. The network entity identifies the adjusted group of assessment devices, and possibly an updated threshold, to the transmission point.

The present disclosure will be described with respect to example embodiments in a specific context, namely a 3GPP LTE-Advanced compliant communications system. The disclosure may also be applied, however, to other standards compliant communications systems, such as IEEE 802.16m, WiMAX, and so on, as well as non-standards compliant communications systems that support multiple point reception.

Figure 1:
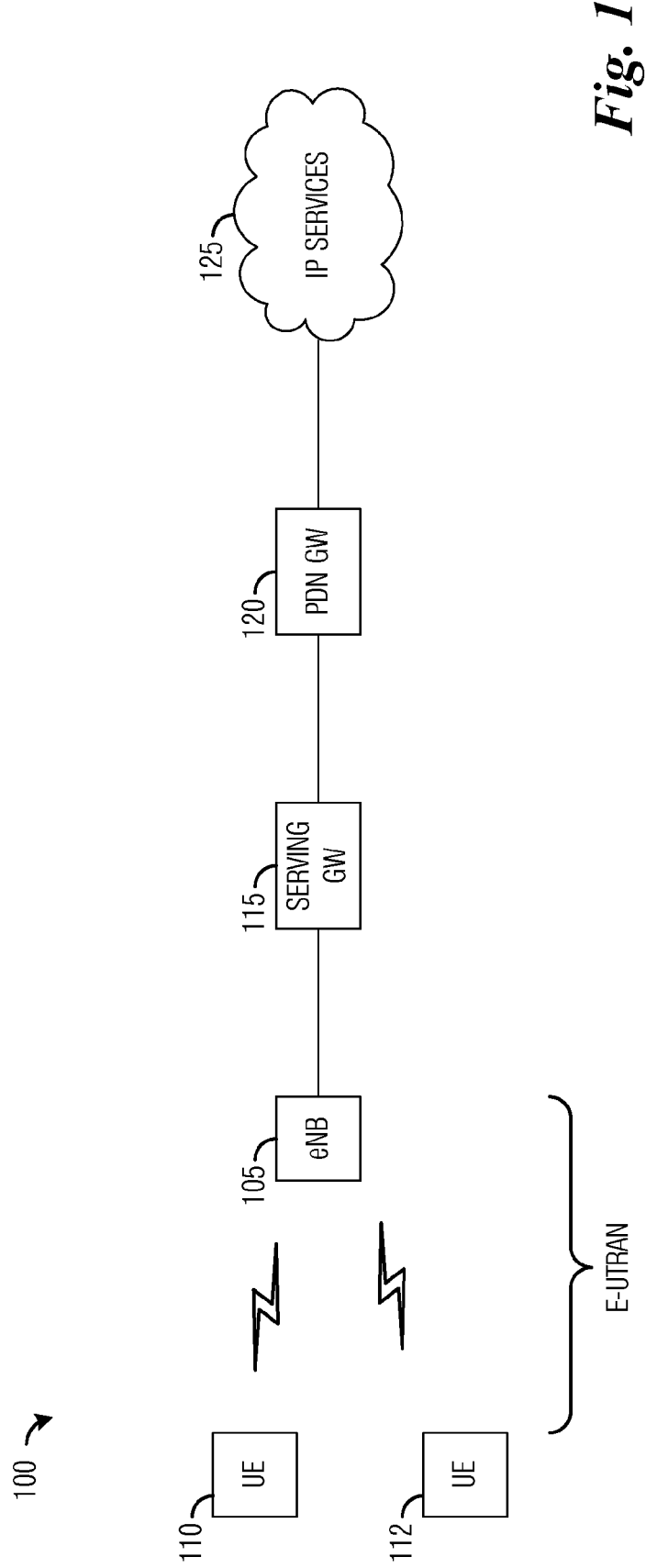
FIG. 1 illustrates an example communications system according to example embodiments described herein.

FIG. 1 illustrates a communications system 100. Communications system 100 includes an eNB 105 serving UE 110 and UE 112. eNB 105 (as well as other eNBs and their associated cells) provides an air interface for communications system 100 and is commonly referred to as an Enhanced Universal Mobile Telecommunications System (UMTS) Terrestrial Radio Access Network (E-UTRAN). A connection may be setup from a UE through eNB 105, a serving gateway (serving GW) 115, and a packet data network gateway (PDN GW) 120 to an operator's Internet Protocol (IP) services network 125.

While it is understood that communications systems may employ multiple eNBs capable of communicating with a number of UEs, only one eNB, two UEs, one serving GW, and one PDN GW are illustrated for simplicity.

Figure 2:
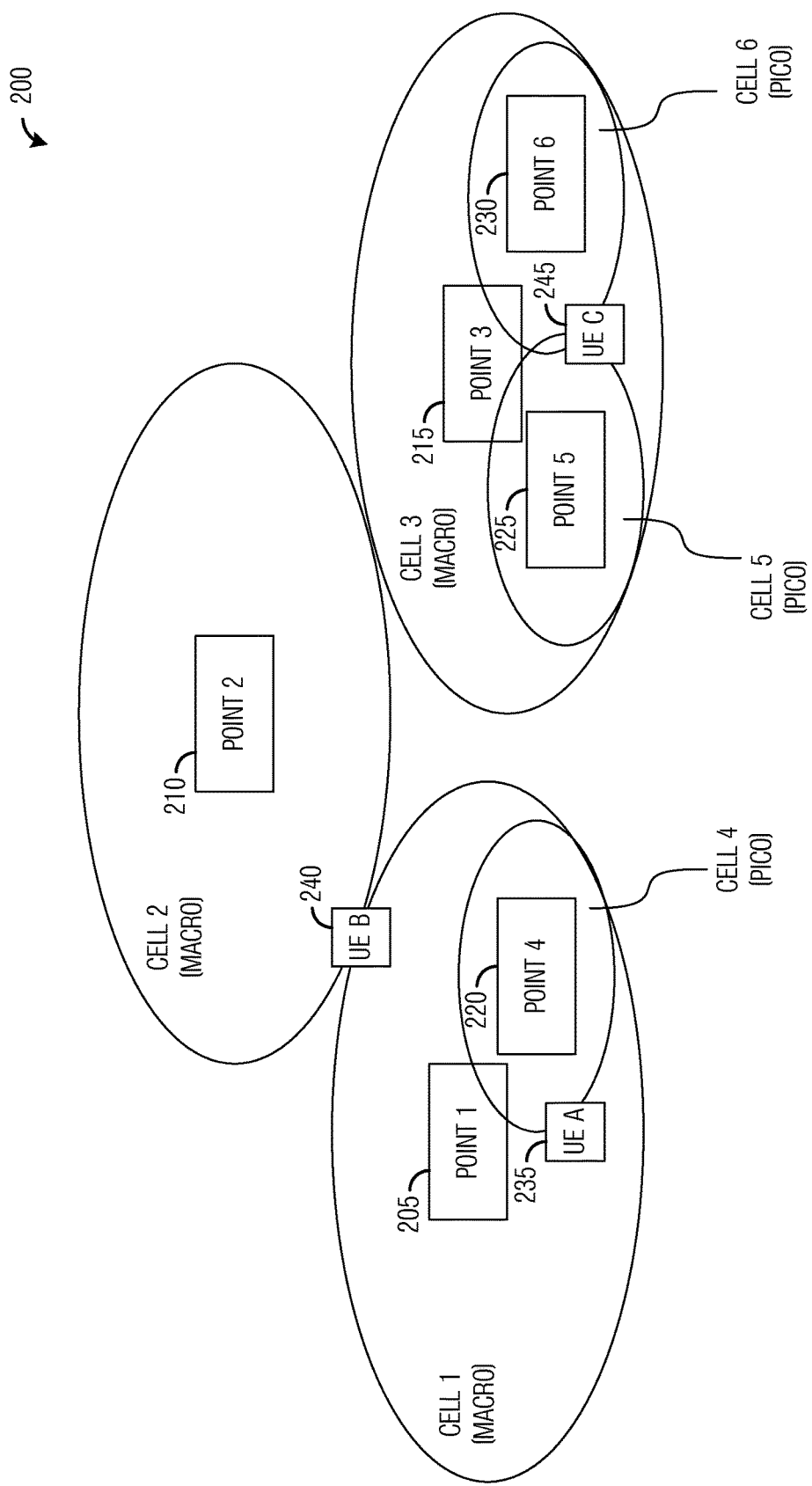
FIG. 2 illustrates an example communications system, wherein communications system comprises a variety of communication points according to example embodiments described herein.

FIG. 2 illustrates a communications system 200, wherein communications system 200 comprises a variety of communication points. Communications system 200 includes a plurality of macro cell points, such as point 1 205, point 2 210, and point 3 215. Macro cell points may be referred to as eNBs. Communications system 200 also includes a plurality of pico cell points, such as point 4 220, point 5 225, and point 6 230. Typically, pico cell points are reduced power points that are deployed to help improve coverage in low coverage areas or to provide additional resources in high usage areas. Pico cell points may or may not be part of a planned infrastructure. Examples of pico cell points include remote radio heads (RRH), femto cell points, home evolved NodeBs (HeNB), and the like. Without loss of generality, the terms point and communications point may refer to transmission points as well as reception point. The terms point and communications point may be used interchangeably. Furthermore, a point (and equivalently, a communications point) may be an eNB, a cell, a cluster of points, a CoMP cluster, a resource (such as a channel state information reference signal (CSI-RS) resource), and the like.

Communications system 200 also includes a plurality of UEs, such as UE A 235, UE B 240, and UE C 245. As shown in FIG. 2, UE A 235 may be located so that it is capable of transmitting transmissions to point 1 205 and/or point 4 220 as well as receiving transmissions from point 1 205 and/or point 4 220. Similarly, UE B 240 is capable of communicating with point 1 205 and point 2 210, and UE C 245 is capable of communicating with point 3 215, point 5 225, and point 6 230.

Figure 3:
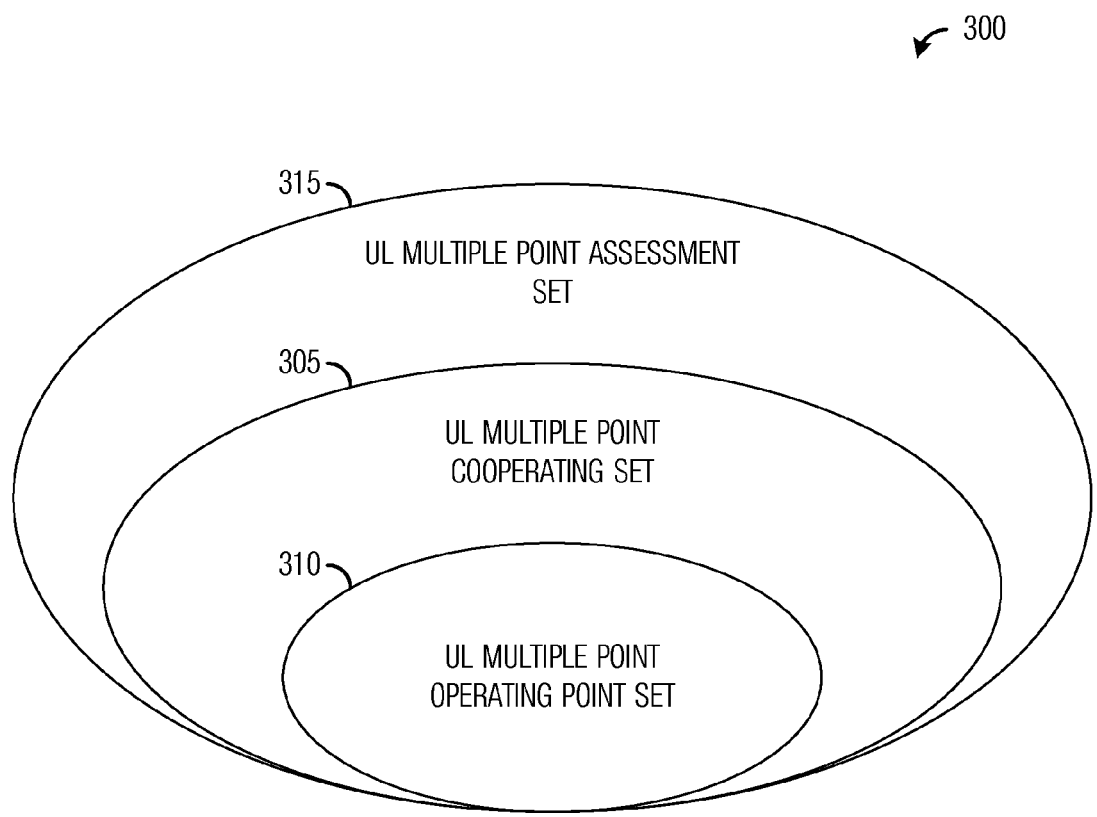
FIG. 3 illustrates an example relationship diagram for uplink (UL) multiple point sets according to example embodiments described herein.

FIG. 3 illustrates a relationship diagram 300 for uplink (UL) multiple point sets. UL multiple point sets comprise three UL multiple point sets: an UL multiple point cooperating set 305, an UL multiple point operating point set 310, and an UL multiple point assessment set 315. UL multiple point cooperating set 305 includes a set of communications (e.g., reception) points, which may or may not be geographically separated, directly or indirectly participating in receiving communicating data information from a UE in a time-frequency resource. UL multiple point operating point set 310 includes a set of communications (e.g., reception) points, which may or may not be geographically separated, actively receiving communicating data from a UE. UL multiple point operating point set 310 is a subset of UL multiple point cooperating set 305. It is noted that in the context of CoMP operation, the UL multiple point operating set may be the same as a CoMP reception point(s).

UL multiple point assessment set 315 includes a set of communications (e.g., reception) points for which channel condition information, such as channel path loss, reference signal received power, channel state information, channel statistical information, and the like, of a wireless communications link between a respective communications (e.g., reception) point in the set and a UE is reported. UL multiple point assessment set 315 is a superset of UL multiple point cooperating set 305.

It is noted that in general, multiple point cooperating set, multiple point operating point set, and multiple point assessment set may be defined similarly for UL communications, DL communications, or both. It is also noted that an UL multiple point set (e.g., an UL multiple point cooperating set, an UL multiple point operating point set, or an UL multiple point assessment set) may be different from its corresponding DL multiple point set (e.g., a DL multiple point cooperating set, a DL multiple point operating point set, or a DL multiple point assessment set). As an example, an UL multiple point cooperating set may be different from a corresponding DL multiple point cooperating set.

As discussed previously, CoMP is a specific form of multiple point operation wherein multiple communications (e.g., transmission or reception) points transmit and/or receive in a coordinated way. Therefore, the discussion of multiple point operation also applies to CoMP operation and should not be construed as being limiting to either the scope or the spirit of the example embodiments.

Typically, a discussion of a communications point (or features and/or characteristics thereof) also applies to a transmission point or a reception point. Therefore, the discussion of communications points, sets of communications points, and vice versa, should not be construed as being limiting to the scope or the spirit of the example embodiments. Similarly, a discussion of a reception point (or features and/or characteristics thereof) also applies to a transmission point and a communications point. Therefore, the discussion of reception points, sets of reception points, and the like, should not be construed as being limiting to the scope or spirit of the example embodiments.

Generally, a network side of a communications system (such as an eNB, a multiple point controller, a mobility management entity (MME), and the like) is responsible for selecting, coordinating, and/or maintaining multiple point sets. The network side is also responsible for coordinating the resource usage among the different reception points in the multiple point sets. In order to simplify discussion, it is assumed that the selecting, coordinating, and/or maintaining of the multiple point sets are for UL multiple point sets. However, the example embodiments are also applicable, in part, to DL multiple point sets. Therefore, the discussion of UL multiple point sets should not be construed as being limiting to either the scope or the spirit of the example embodiments.

In addition, it may be beneficial for the network side to select one reception point as the major point among UL multiple point reception point(s) to minimize the UE power consumption, the data combining/coordinating overhead among multiple point reception points, as well as the packet processing delay. A natural criterion of picking the major point may be to choose the reception point with the best UL channel condition, for example. Furthermore, the major point may be used by the UE as the reference for power control. It is noted that the point with the best UL channel condition might not be the point with the best DL channel condition, especially under heterogeneous network deployment. In addition, the major point may not necessarily be a UL multiple point primary cell, communications point, resource, eNB, cluster, and the like where control messages are processed.

Figure 4A:
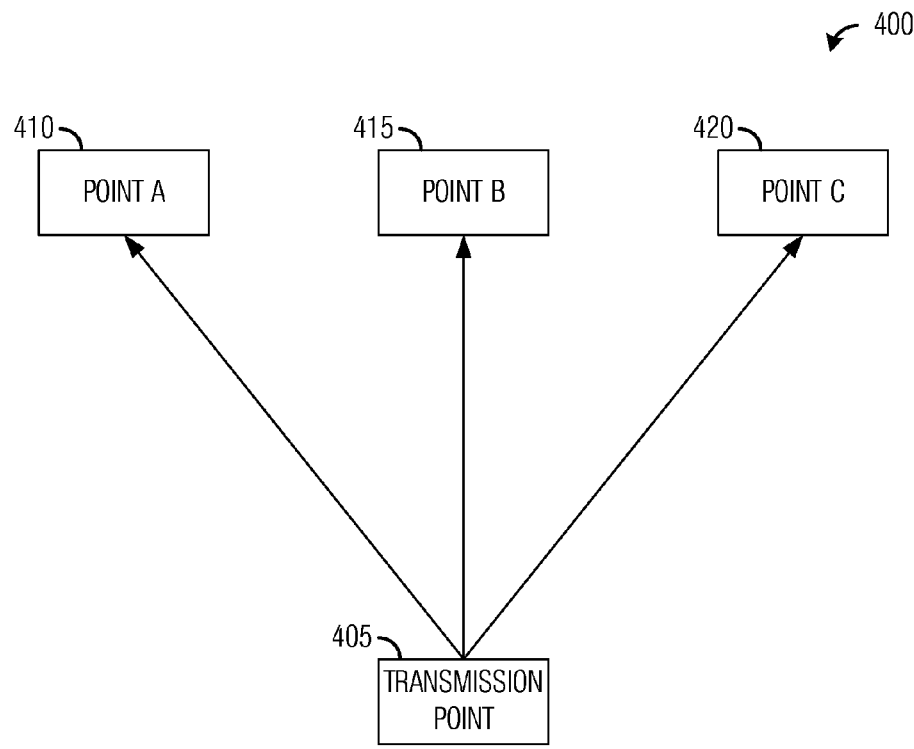
FIG. 4a illustrates an example first UL multiple point, e.g., CoMP, configuration according to example embodiments described herein.

FIG. 4a illustrates a first UL multiple point, e.g., CoMP, configuration 400. First UL configuration 400 includes a transmission point 405, such as a UE, transmitting UL data to a point A 410, a point B 415, and a point C 420. Transmission point 405 may transmit to point A 410, point B 415, and point C 420 in a coordinated fashion (as in CoMP operation) or uncoordinated fashion. Point A 410, point B 415, and point C 420 may then cooperate with one another to reconstruct the transmission from transmission point 405.

Figure 4B:
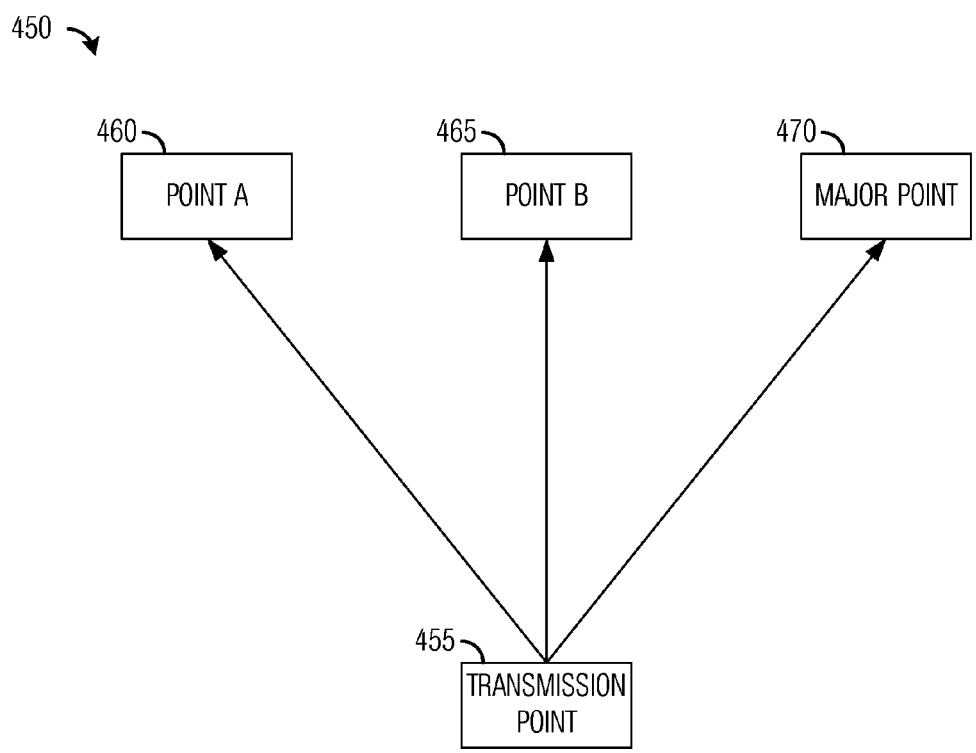
FIG. 4b illustrates an example second UL multiple point, e.g., CoMP, configuration according to example embodiments described herein.

FIG. 4b illustrates a second UL multiple point, e.g., CoMP, configuration 450. Second UL configuration 450 includes a transmission point 455, such as a UE, transmitting UL data to a point A 460, a point B 465, and a major point 470. Transmission point 455 may transmit to point A 460, point B 465, and major point 470 in a coordinated fashion or uncoordinated fashion. Point A 460, point B 465, and major point 470 may then cooperate with one another to reconstruct the transmission from transmission point 455.

The communications points, e.g., point A 460, point B 465, and major point 470, may be ordered according to a quality of a channel between the transmission point and the communications points. A communications point having the highest quality channel with the transmission point may be labeled as a major point, e.g., major point 470. In general, the major point may have the highest probability of accurately receiving the transmission from the transmission point. In addition, received transmissions at a major point may be given greater weight. Typically, a major point may be a communications point having a channel with the smallest path loss.

The UL multiple point sets (i.e., UL multiple point cooperating set 305, UL multiple point operating point set 310, and UL multiple point assessment set 315) may be managed according to UL channel conditions of communications channels between the transmission point and the communications points.

The optimal selection of UL multiple point sets and the major point as defined above highly depends on a good knowledge of UL channel conditions between transmission point and reception points. Moreover, the optimal selection may vary over time, especially when transmission point (and potentially, a reception point) moves around. Therefore, it may be desirable for the communications system to obtain reliable knowledge of UL path losses between the transmission point and different reception points on a timely basis, in order to make UL multiple point set selection efficiently and save transmission point transmission power.

Consequently, there may be a challenge that needs to be addressed, namely, how to measure or compare the UL channel condition information among different channels between the transmission point and reception points. Further, another challenge may relate to how to inform the communications system of the knowledge about UL channel condition information.

The UL channel condition information may be derived from measurements of the UL channels themselves or, in some communications system configurations, through measurements of DL channels. As an example, in communications systems configured for time division duplexed operation, UL channel conditions may be derived from DL channel conditions through channel reciprocity since the UL channel and the DL channels are substantially the same channel simply separated in time. As another example, in communications systems configured for frequency division duplexed operation, it may be difficult to derive UL channel conditions from DL channel conditions with an extremely high level of confidence in terms of absolute values. However, channel reciprocity still applies in the sense that it may be possible to derive relative quality relationships of different UL channel conditions from DL channel conditions. As an example, if a first channel has smaller DL channel path loss than a second channel, then the UL path loss of the first channel is most likely also smaller than that of the second channel.

A first example embodiment makes use of DL channel conditions measured by the transmission point and derives the UL channel conditions utilizing channel reciprocity, for example. The transmission point may report the derived UL channel conditions to a network entity, such as an eNB, a multiple point controller, a mobility management entity (MME), a coordinating entity, and the like, for management of the UL multiple point sets. In an alternative example embodiment, the UE may report the DL channel conditions to the network entity and the network entity may derive the UL channel condition accordingly.

Figure 5:
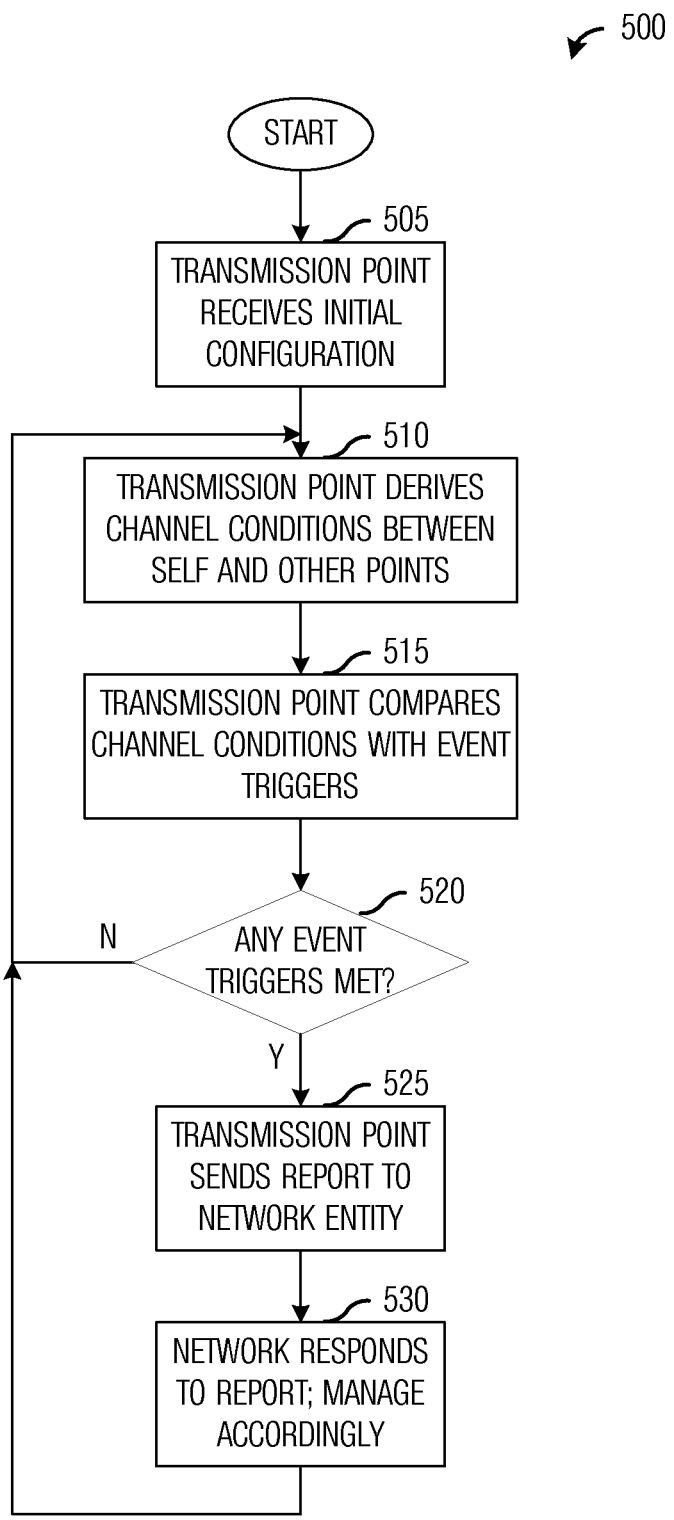
FIG. 5 illustrates an example flow diagram of operations in managing UL multiple point sets with UL channel condition information derived from DL channel measurements according to example embodiments described herein.

FIG. 5 illustrates a flow diagram of operations 500 in managing UL multiple point sets with UL channel condition information derived from DL channel measurements. Operations 500 may be indicative of operations occurring in a transmission point and a network entity of a communications system as UL multiple point sets are managed using UL channel condition information derived from DL channel measurements.

Operations 500 may begin with a transmission point, such as a UE, receiving an initial configuration (block 505). As an example, the transmission point may receive information about a UL multiple point assessment set and/or a UL multiple point cooperating set. The members (communications points) of the UL multiple point assessment set and/or a UL multiple point cooperating set may be referred to as assessment devices. For discussion purposes, consider a communications system as shown in FIG. 2 and specifically, UE C 245. UL multiple point operating point set of UE C 245 may initially include point 3 215, while UL multiple point assessment set of UE C 245 may initially include point 3 215, point 5 225, and point 6 230.

Additionally, transmission point may also receive other configuration parameters such as threshold(s), reference value(s) and/or point(s), and the like, to specify one or more event triggers. The one or more event triggers may be specified using a reference value(s) and threshold(s). As an example, the one or more event triggers may initiate a report of UL channel condition information by the transmission point. The use of the event trigger(s) may help reduce the number of reports made by the transmission point, which may result in a reduction in overall reporting overhead, reduced power consumption by the transmission point, reduced traffic load on the communications system, and the like.

As an example, considering a situation where there are three event triggers. The three event triggers may be specified using a reference value, such as a derived path loss between the transmission point and the major point of the UL multiple point operating point set, referred to as reference path loss, and three thresholds, th1, th2, and th3. It is noted that the reference path loss may be chosen as other values and may be based on other criteria, and not necessarily the derived path loss of the major point. It is also noted that the reference path loss may vary with time. As an example, as the transmission point moves, the channel condition between the transmission point and the major point may likely change. Therefore, to accurately reflect the changing channel condition, the reference path loss changes with the changing channel condition. As an example, the reference path loss may be updated periodically, upon the availability of new measurement results, or when the channel condition change exceeds a threshold. As another example, the reference path loss may be an average (or some other mathematical expression) of the channel condition.

According to an example embodiment, the event triggers may be as follows:

X1: The derived path loss, e.g., the derived UL path loss or the derived DL path loss, of channel X between the transmission point and reception point X is smaller than (reference path loss+th1), where reception point X is a member of the UL multiple point assessment set but not a member of the UL multiple point cooperating set. Event trigger X1 may be used to suggest the addition of reception point X to the UL multiple point cooperating set. It is noted that th1 may be a positive value. It is also noted that the derived path loss may not necessarily be equal to an actual UL path loss of channel X, but will reflect the UL channel path loss in relative sense.

X2: The derived path loss, e.g., the derived UL path loss or the derived DL path loss, of channel X between the transmission point and reception point X is smaller than (reference path loss−th2), where reception point X is a member of the UL multiple point cooperating set but not the major point. Event trigger X2 may be used to suggest the changing of the major point. It is noted that th2 may be a positive value.

X3: The derived path loss, e.g., the derived UL path loss or the derived DL path loss, of channel X between the transmission point and reception point X is larger than (reference path loss+th3), where reception point X is a member of the UL multiple point cooperating set. Event trigger X3 may be used to suggest the removal of reception point X from the UL multiple point cooperating set.

As an example, the thresholds may be configured as th1=3 dB, th2=3 dB, and th3=6 dB. It is noted that thresholds may be configured to other values.

According to another example embodiment, the event triggers may be as follows:

Y12: The derived path loss, e.g., the derived UL path loss or the derived DL path loss, of channel X between the transmission point and reception point X is smaller than (reference path loss+th1). If the reception point is a member of the UL multiple point assessment set but not in the UL multiple point cooperating set and th1 is a positive value, event trigger Y12 defaults to event trigger X1 and may be used to suggest addition of a point to the UL multiple point cooperating set. Furthermore, if the reception point is a member of the UL multiple point cooperating set but is not the major point and th1 is a negative value, event trigger Y12 defaults to event trigger X2 and may be used to suggest changing of the major point.

Y3: The derived path loss, e.g., the derived UL path loss or the derived DL path loss, of channel X between the transmission point and reception point X is larger than (reference path loss+th3), where reception point X is a member of the UL multiple point cooperating set. Event trigger Y3 may suggest removal of a point from the UL multiple point cooperating set.

Please refer to an Addendum to the specification for example embodiments of specific implementations of the above event trigger definitions, radio resource control (RRC) protocols and/or messages for configuring events, and measurements results reporting.

The transmission point may derive UL channel conditions by measuring DL channel conditions of channels between itself and other points, such as in the UL multiple point assessment set or in the UL multiple point cooperating set (block 510). The other points may be referred to as assessment devices. As an example, the transmission point may measure the DL channel conditions using pilot signals transmitted by the other points. As an alternative example, the transmission point may measure the DL channel condition using reference signals (e.g., common reference signal (CRS), channel state information reference signal (CSI-RS), and the like) transmitted by the other points.

Generally, the transmit power levels of the other points may be obtained by the transmission point, e.g., through broadcast messages made by the other points or other RRC messages, or reflected in the configuration parameters (e.g., thresholds) for individual event triggers. Therefore, the transmission point may be able to derive the path loss of the individual channels using the measured DL channel condition and the DL transmit power levels of the other points. As an example, let the transmit power level of a point X using channel X be $TP_X$ and the measured DL received signal power of the channel X be $RP_{DL\_X}$ (based on, e.g., RSRP measurement, CSI measurement, and the like), and the DL path loss of channel X be $PL_{DL\_X}$. The DL path loss of channel X may be derived from the transmit power of point X and the measured DL received signal power of channel X, and is expressible as $$PL_{DL\_X}=TP_X-RP_{DL\_X}.$$

Through channel reciprocity, the UL path loss of channel X ($PL_{UL\_X}$) may be reflected by the DL path loss of channel X in a relative sense.

The transmission point may compare the derived channel conditions (e.g., path loss) with event triggers(s) to determine if the transmission point is to report the UL channel conditions to the network entity (block 515). The transmission point may perform a check to determine if any of the event trigger(s) have been met (block 520). If none of the event trigger(s) have been met, the transmission point may return to block 510 to re-measure the UL channel conditions.

If one or more of the event trigger(s) have been met, the transmission point may send a report of the UL channel conditions to the network entity (block 525). The report of the UL channel conditions may be sent to the network entity in a message(s), such as a RRC message. As an example, the message may include identifying information of the reception point(s), UL path loss value(s), as well as possibly identifying information of the event trigger(s) and a timestamp. The message may be embedded within another message.

As an example, the transmission point may report only the UL channel condition(s) that meet the one or more event trigger(s). As another example, the transmission point may report the UL channel conditions of all points measured. As another example, the transmission point may report the UL channel condition(s) of a limited number of points, e.g., the best (or worst) five. The network entity responds accordingly to the report from the transmission point (block 530). As an example, the network entity may change the reception points in the UL multiple point sets, e.g., UL multiple point cooperating set, according to the UL channel condition(s) provided by the transmission point. It is noted that the network entity may have the option of not responding to the UL channel condition(s) provided by the transmission point. It is also noted that the network entity may combine multiple reports from the transmission point to get a picture of the UL channel condition over time before responding to the report(s) from the transmission point.

As an illustrative example, consider a situation where the UL channel condition, e.g., the derived path loss, between the transmission point and point 5 225 is smaller than (reference path loss+th1), e.g., the derived path loss is smaller than the derived path loss between the transmission point and point 3 215 plus 3 dB. Since the condition for event trigger X1 is met, a message (e.g., a RRC message) containing information about point 5 225, the derived path loss, and the like, is sent to the network entity. The message may be embedded within another message. Upon receiving the message, the network entity, such as point 3 215, may update the transmission point's UL multiple point cooperating set to include {point 3 215 and point 5 225}, i.e., adding point 5 225 to the multiple point cooperating set.

Additionally, consider a situation where the UL channel condition, e.g., the derived path loss, between the transmission point and point 6 230 is smaller than (reference path loss+th1), e.g., the derived path loss is smaller than the derived path loss between the transmission point and point 3 215 plus 3 dB. Since the condition for event trigger X1 is met, a message (e.g., a RRC message) containing information about point 6 230, the derived path loss, and the like, is sent to the network entity. The message may be embedded within another message. Upon receiving the message, the network entity, such as point 3 215, may update the transmission point's UL multiple point cooperating set to include {point 3 215, point 5 225, and point 6 230}, i.e., adding point 6 230 to the multiple point cooperating set.

Additionally, consider a situation where the UL channel condition, e.g., the derived path loss, between the transmission point and one of the non-major points, e.g., point 5 225, is smaller than (reference path loss−th2), e.g., the derived path loss is smaller than the derived path loss between the transmission point and point 3 215—3 dB. Since the condition for event trigger X2 is met, a message (e.g., a RRC message) containing information about point 5 225, the derived path loss, and the like, is sent to the network entity. The message may be embedded within another message. Upon receiving the message, the network entity, such as point 3 215, may update the transmission point's major point to point 5 225 and set the UL path loss between the transmission point and point 5 225 as reference path loss.

Furthermore, consider a situation where the UL channel condition, e.g., the derived path loss, between the transmission pint and one of the non-major points, e.g., point 6 230, is greater than (reference path loss+th3), e.g., the derived path loss is greater than the derived path loss between the transmission point and point 5 225 plus 6 dB. Since the condition for event trigger X3 is met, a message (e.g., a RRC message) containing information about point 6 230, the derived path loss, and the like, is sent to the network entity. The message may be embedded within another message. Upon receiving the message, the network entity, such as point 5 225, may update the transmission point's UL multiple point cooperating set to include {point 3 215 and point 5 225}, i.e., point 6 230 is removed from the UL multiple point cooperating set of the transmission point.

According to the first example embodiment, the transmission point measures the DL channel conditions between the transmission point and different points, and compares the corresponding UL channel condition assuming channel reciprocity. Once the channel condition difference between one point and a reference point exceeds a pre-determined threshold, the transmission point may send an indication to the network to report the change and/or event so that the network may take actions if needed.

Figures 6A, 6B:
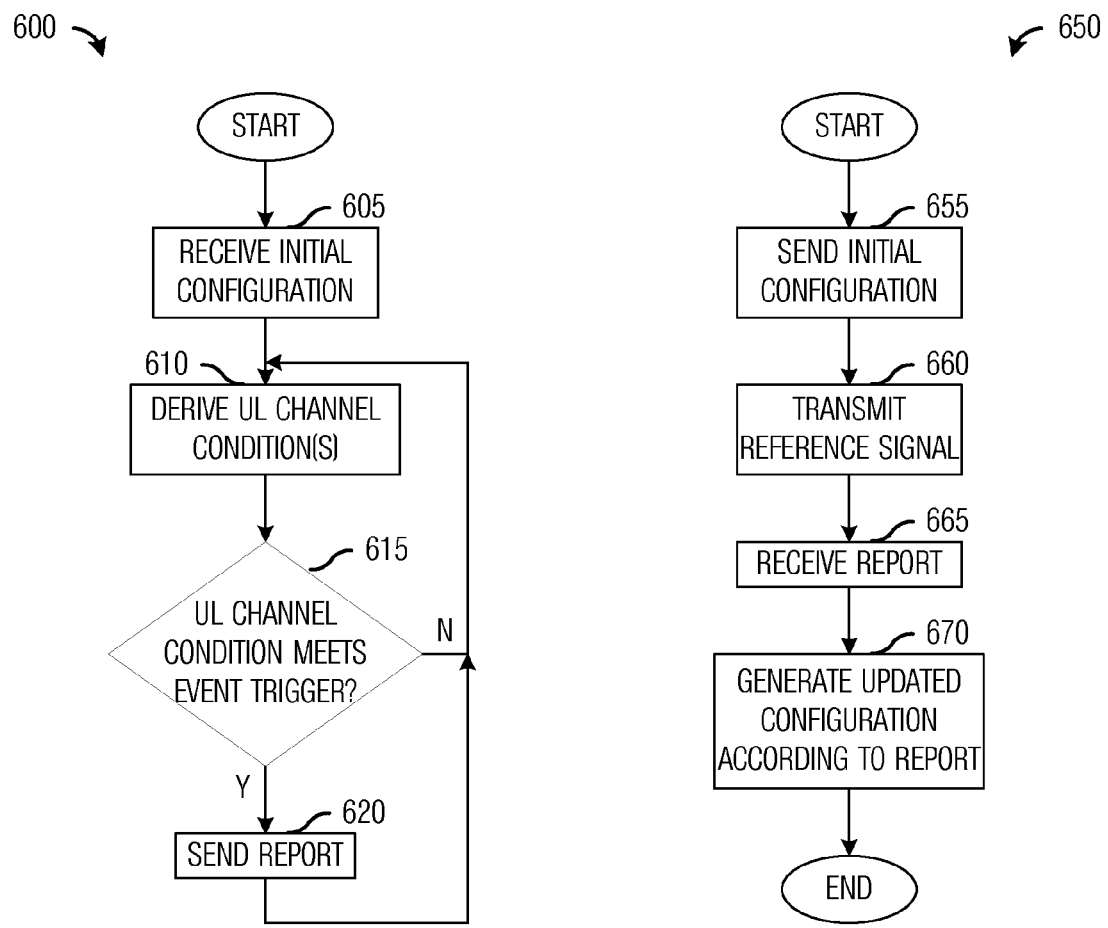
FIG. 6a illustrates an example flow diagram of operations of transmission point operations in reporting UL channel condition information derived from DL channel measurements according to example embodiments described herein.
FIG. 6b illustrates an example flow diagram of operations of network entity operations in managing UL multiple point sets with UL channel condition information derived from DL channel measurements according to example embodiments described herein.

FIG. 6a illustrates a flow diagram of operations 600 of transmission point operations in reporting UL channel condition information derived from DL channel measurements. Operations 600 may be indicative of operations occurring in a transmission point, such as transmission point 405 and transmission point 455, as the transmission point reports UL channel condition information derived from DL channel measurements to a network entity.

Operations 600 may begin with the transmission point receiving initial configuration information (block 605). As an example, the initial configuration information may include information about a UL multiple point assessment set and/or a UL multiple point cooperating set. The initial configuration information may also include threshold(s), reference value(s), and the like, to specify one or more event triggers.

The transmission point may then derive UL channel conditions for channels between itself and assessment devices (in either the UL multiple point assessment set or the UL multiple point cooperating set, for example) (block 610). As discussed previously, the transmission point may derive the UL channel conditions using channel reciprocity, DL channel measurements (such as reference signal received power measurements, and the like), and transmit power levels for the assessment devices (e.g., the eNBs). The transmission point may perform a check to determine if any of the UL channel conditions meet the condition(s), such as threshold(s), for an event trigger (block 615). If none of the UL channel conditions meet the condition(s) for an event trigger, the transmission point may return to block 610 to derive additional UL channel conditions.

If one or more of the UL channel conditions meet the condition(s) for an event trigger, the transmission point may send a report in a message, e.g., a RRC message, to the network entity (block 620). The report may include information about the reception points associated with the one or more UL channel condition(s) that meet the condition(s) for the event trigger, the UL channel condition(s), and the like. The transmission point may receive an updated configuration from the network entity.

It is noted that although the discussion of FIG. 6a focuses on UL channel condition and UL channel condition information, the transmission point may also operate using DL channel condition. As an example, the transmission point may measure the DL channel condition (as in block 610) and then perform a check to determine if any of the DL channel conditions meet the condition(s) for an event trigger (as in block 615). If one or more of the DL channel conditions meet the condition(s) for an event trigger, the transmission point may send a report in a message to the network entity (as in block 620). It is also noted that if DL channel condition information is used in place of UL channel condition information, the condition(s) for an event trigger may or may not require adjustment.

FIG. 6b illustrates a flow diagram of operations 650 of network entity operations in managing UL multiple point sets with UL channel condition information derived from DL channel measurements. Operations 650 may be indicative of operations occurring in a network entity, such as point C 420 and major point 470, as the network entity manages UL multiple point sets with UL channel condition information derived from DL channel measurements. Additionally, the network entity may be an entity which is not a member of the UL multiple point set of the transmission point, such as another eNB, a multiple point controller, a mobility management entity (MME), a coordinating entity, and the like.

Operations 650 may begin with the network entity sending an initial configuration to the transmission point (block 655). As an example, the initial configuration information may include information about a UL multiple point cooperating set and/or a UL multiple point assessment set. The initial configuration information may also include threshold(s), reference value(s), and the like, to specify one or more event triggers. The initial configuration may be sent in a RRC message. The network entity (if the network entity is a point to be measured) may transmit a pilot signal, a reference signal, and the like (block 660), for the transmission point to perform DL measurements.

The network entity may receive a message, e.g., a RRC message, including a report of UL channel conditions that meet condition(s) for an event trigger (block 665). The report may include information about the reception points associated with the one or more UL channel condition(s) that meet the condition(s) for the event trigger, the UL channel condition(s), and the like. The network entity may make changes to the UL multiple point sets according to the report and generate an updated configuration (block 670). The network entity may send the updated configuration to the transmission point.

It is noted that the network entity may receive a message including a report of DL channel conditions that meet condition(s) for an event trigger rather than UL channel conditions that meet condition(s) for an event trigger. The network entity may still be able to manage the UL multiple point sets according to the DL channel conditions in a manner similar to it managing the UL multiple point sets according to the UL channel conditions. It is also noted that the network entity may or may not derive the UL channel conditions from the DL channel conditions. As an example, the network entity may derive the UL channel conditions from the DL channel conditions using channel reciprocity. As another example, the network entity may be able to derive relational information about the UL channel conditions from the DL channel conditions. As an illustrative example, the network entity may be able to derive with a fair degree of certainty that a channel with a best (or worse) DL channel condition also has a best (or worst) UL channel condition.

A second example embodiment makes use of UL channel conditions measured by the points in the UL multiple point set(s). Since the points are directly measuring the UL channel conditions, derivation of the UL channel conditions from indirect channel measurements are not needed. The point may share the UL channel conditions with other points or a network entity, such as an eNB, a multiple point controller, an MME, and the like, for management of the UL multiple point sets. According to the second example embodiment, the point measures and/or calculates its own UL channel condition and exchanges the results with other points.

Figures 7A, 7B:
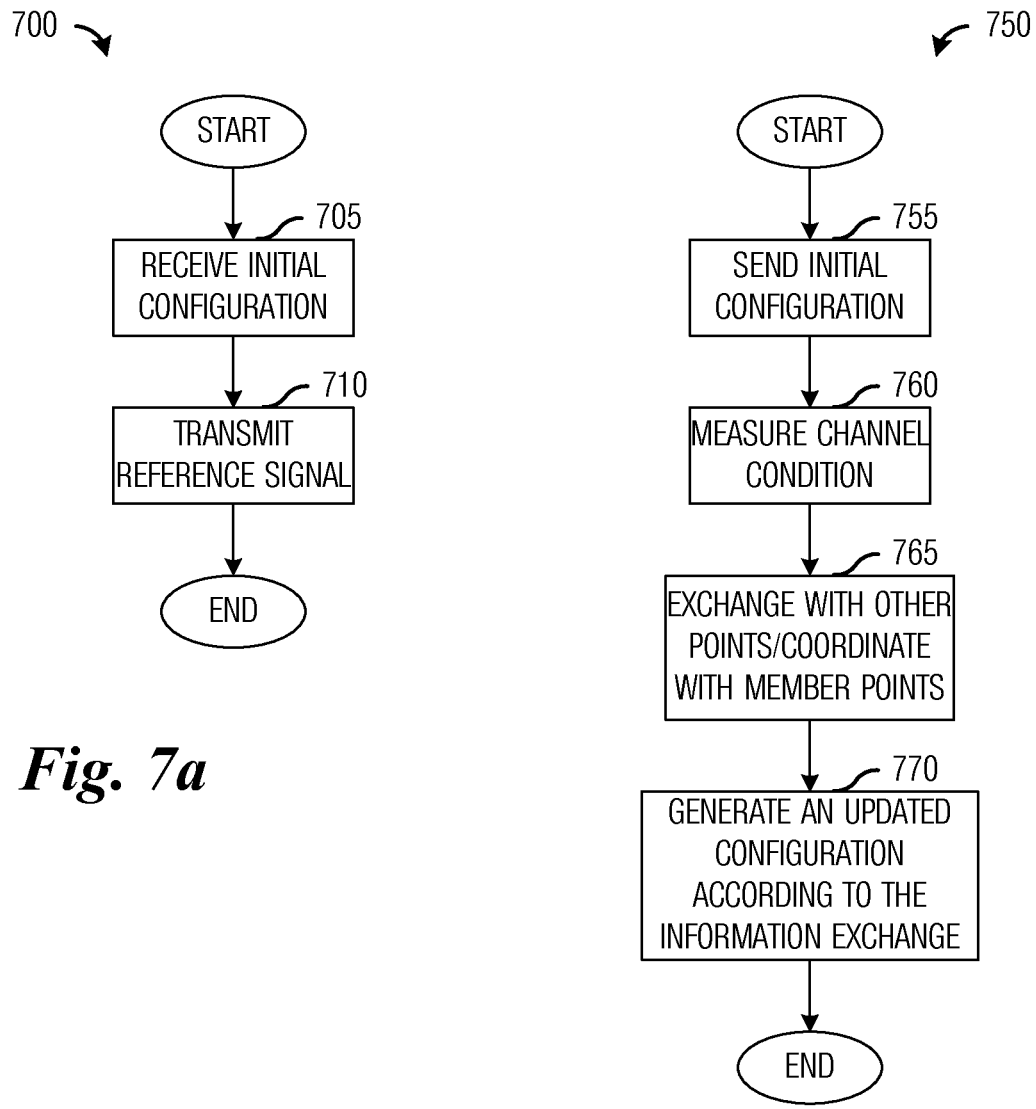
FIG. 7a illustrates an example flow diagram of operations of transmission point operations in managing UL multiple point sets with directly measured UL channel condition information according to example embodiments described herein.
FIG. 7b illustrates an example flow diagram of operations of network entity operations in managing UL multiple point sets with directly measured UL channel condition information according to example embodiments described herein.

FIG. 7a illustrates a flow diagram of operations 700 of transmission point operations in managing UL multiple point sets with directly measured UL channel condition information. Operations 700 may be indicative of operations occurring in a transmission point, such as transmission point 405 and transmission point 455, as the transmission point cooperates in the managing of UL multiple point sets.

Operations 700 may begin with the transmission point receiving initial configuration information (block 705). The initial configuration may be received from a network entity. Alternatively, the initial configuration may be specified by an operator of the communications system, a technical standard, and the like, and may be stored in the transmission point or provided to the transmission point during initial attachment. As an example, the initial configuration information may include information about the periodicity, the transmission power, the timing of sending a reference signal, and the like.

The transmission point may transmit a reference signal according to the configuration (block 710). The reference signal transmitted by the transmission point may be used by each point in the transmission point's UL multiple point set(s) to measure an UL channel condition between the transmission point and the point. As an example, the reference signal may be a sounding reference signal (SRS). The reference signal may be transmitted at a known power level. The transmission point may receive updated configuration information.

FIG. 7b illustrates a flow diagram of operations 750 of network entity operations in managing UL multiple point sets with directly measured UL channel condition information. Operations 750 may be indicative of operations occurring in a network entity, such as point C 420 and major point 470, as the network entity manages UL multiple point sets. The network entity may be an assessment device. Additionally, the network entity may be an entity which is not a member of the UL multiple point set of the transmission point, such as another eNB, a multiple point controller, a MME, a coordinating entity, and the like.

Operations 750 may begin with the network entity sending initial configuration information to a transmission point (block 755). As an example, the initial configuration information may include information about the periodicity, the transmission power, the time and/or frequency information for sending SRS, and the like. The network entity may directly transmit the initial configuration to the transmission point or directly or indirectly have a different entity in the communications system send the initial configuration to the transmission point.

If the network entity is a point to be assessed, i.e., an assessment device, (for example, the network entity is a member of the UL multiple point assessment set or the UL multiple point cooperating set of the transmission point), the network entity may measure an UL channel condition of a channel between the network entity and the transmission point (block 760). The network entity may measure the UL channel condition by measuring received signal strength of a reference signal (e.g., an SRS) transmitted by the transmission point.

The network entity may exchange UL channel condition information with member points, e.g., points that are members of the UL multiple point assessment set or the UL multiple point cooperating set of the transmission point (block 765). The exchange of the UL channel condition may allow the network entity to coordinate with the member points to manage the UL multiple point sets. As an example, through the exchange of the UL channel condition information, the network entity may determine that one or more of the member points may be added into the UL multiple point cooperating set, one of the member points may replace an existing major point, one or more of the member points may be removed from the UL multiple point cooperating set, and the like. The exchange of the UL channel condition may occur periodically, an occurrence of a specified time, upon receipt of a request, and the like.

As another example, rather than exchanging the UL channel condition with member points, the network entity (for example, a network entity which is a coordinating entity but not an assessment device) may receive UL channel condition from member points. It is noted that the member points may also be required to measure the UL channel condition, and may also be required to send their UL channel condition to the network entity. The network entity may specify a periodicity of the sending of the UL channel condition, a time event for the sending of the UL channel condition, a request event for the sending of the UL channel condition, and the like.

The network entity may make changes to the UL multiple point sets according to the UL channel conditions and generate an updated configuration (block 770). The network entity may send the updated configuration to the transmission point, as well as the member points.

A third example embodiment combines concepts from the first example embodiment and the second example embodiment. In other words, a hybrid solution is provided. As an example, a network entity may select an initial UL multiple point assessment set according to UL channel condition measured directly based on UL reference signals (e.g., SRS transmitted by the transmission point), while management of the UL multiple point cooperating set and/or the UL multiple point operating point set may be based on path loss reports from the transmission point that are reported when event triggers are met.

Figure 8:
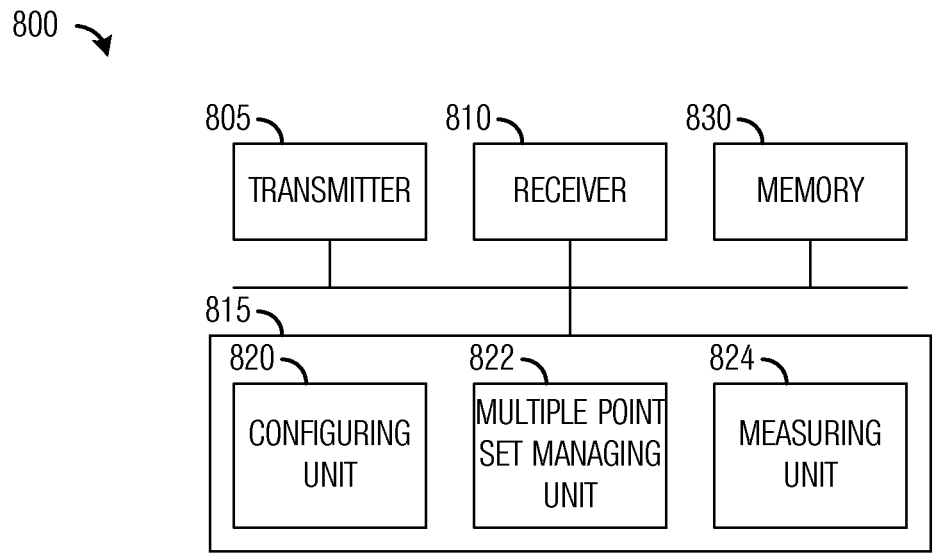
FIG. 8 provides an example first communications device according to example embodiments described herein.

FIG. 8 provides an illustration of a first communications device 800. Communications device 800 may be an implementation of a network entity, eNB, point, coordinating entity, and the like. Communications device 800 may be used to implement various ones of the embodiments discussed herein. As shown in FIG. 8, a transmitter 805 is configured to send packets and/or signals (e.g., CRS, CSI-RS) and a receiver 810 is configured to receive packets and/or signals (e.g., SRS). Transmitter 805 and receiver 810 may have a wireless interface, a wireline interface, or a combination thereof.

A configuring unit 820 is configured to provide configuration parameters for a transmission point, such as thresholds for specifying event trigger(s), and/or periodicity and transmission power of SRS. A multiple point set managing unit 822 is configured to process UL channel conditions provided by a transmission point or other network entities and/or points, to manage the UL multiple point sets. Multiple point set managing unit 822 changes major points, adds and/or removes points from a UL multiple point cooperating set, and the like. A measuring unit 824 is configured to measure UL channel condition according to measurements of a reference signal. Measuring unit 824 determines UL channel condition by measurements of the received signal power of the reference signal, for example. A memory 830 is configured to store configuration information (e.g., UL multiple point sets), UL channel condition, and so on.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while configuring unit 820, multiple point set managing unit 822, and measuring unit 824 may be software modules executing in a processor 815, a microprocessor, a custom circuit, or a custom compiled logic array of a field programmable logic array.

Figure 9:
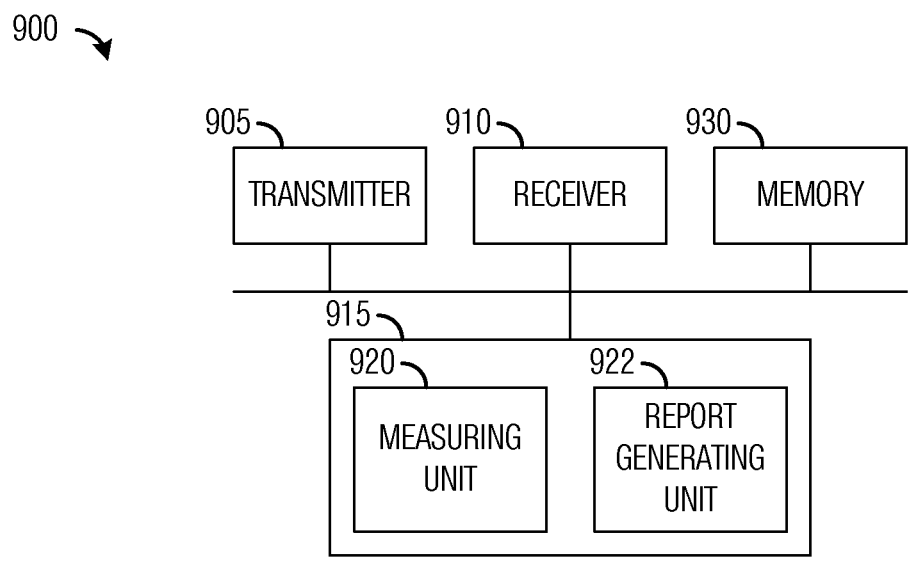
FIG. 9 provides an example second communications device according to example embodiments described herein.

FIG. 9 provides an illustration of a second communications device 900. Communications device 900 may be an implementation of a UE, a transmission point, and the like. Communications device 900 may be used to implement various ones of the embodiments discussed herein. As shown in FIG. 9, a transmitter 905 is configured to send packets and/or signals (e.g., SRS) and a receiver 910 is configured to receive packets and/or signals (e.g., CRS, CSI-RS). Transmitter 905 and receiver 910 may have a wireless interface, a wireline interface, or a combination thereof.

A measuring unit 920 is configured to determine UL channel condition according to measurements of a reference signal transmitted by a point in the UL multiple point sets of communications device 900. Measuring unit 920 measures a DL channel condition (from a received signal measurement of a reference signal or pilot transmitted by the point and a transmit power level of the point, for example), such as DL path loss, and using channel reciprocity determines the UL channel condition (e.g., UL path loss). A report generating unit 922 is configured to generate a report of the UL channel condition, e.g., upon event triggering. The report is subsequently transmitted to a network entity used to manage the UL multiple point sets. A memory 930 is configured to store configuration information (e.g., thresholds, UL multiple point sets), UL channel condition, DL channel condition, transmit power levels, and so on.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while measuring unit 920 and report generating unit 922 may be software modules executing in a processor 915, a microprocessor, a custom circuit, or a custom compiled logic array of a field programmable logic array.

Example embodiments can be utilized in a number of products, processes and services. For example, LTE product could benefit from example embodiments disclosed herein. For instance, example embodiments solve problems related to measurement and reporting of uplink channel condition. With some example embodiments, timely and reliable measurement and reporting of uplink channel condition between UE and multiple reception points is possible with minimized message overhead. This feature would be advantageous with cellular networks and mobile devices.

Although the present disclosure and its advantages have been described in detail, it should be understood that various changes, substitutions and alterations can be made herein without departing from the spirit and scope of the disclosure as defined by the appended claims.

Addendum: Example Changes to RRC spec (36.331)

---

Example 1: Defining Event Triggers X1~X3.

---

*Addition to Section 5.5.4*

*******************************************************************

5.5.4.x1    Event X1 (Candidate becomes no worse than the Reference by an offset)

The UE shall:

1> consider the entering condition for this event to be satisfied when condition X1-1, as specified below, is fulfilled;

1> consider the leaving condition for this event to be satisfied when condition X1-2, as specified below, is fulfilled;

NOTE    The Candidate that triggers the event is on the frequency (e.g., as indicated in the associated *measObject*) which may be different from the frequency used by the Reference.

Inequality X1-1 (Entering condition)

$$Mc + Ofc + Opc + Hys < Mr + Ofr + Opr + Off$$

Inequality X1-2 (Leaving condition)

$$Mc + Ofc + Opc - Hys > Mr + Ofr + Opr + Off$$

The variables in the formula are defined as follows:

*Mc* is the measurement result of the channel condition (e.g., path loss) of the candidate point/cell/resource, not taking into account any offsets.

*Ofc* is the frequency specific offset of the frequency of the candidate (e.g., *x1-offsetFreq* or *x-offsetFreq* as defined within *measObjectEUTRA* corresponding to the frequency of the candidate), and set to zero if not configured for the candidate.

*Opc* is the point/cell/resource specific offset of the candidate (e.g., *x1-pointIndividualOffset* or *x-pointIndividualOffset* as defined within *measObjectEUTRA* corresponding to the frequency of the candidate), and set to zero if not configured for the candidate.

*Mr* is the measurement result of channel condition (e.g., path loss) of the reference point/cell/resource, not taking into account any offsets.

*Ofr* is the frequency specific offset of the reference, (e.g., *x1-offsetFreq* or *x-offsetFreq* as defined within *measObjectEUTRA* corresponding to the frequency of the reference), and set to zero if not configured for the reference.

*Opr* is the point/cell/resource specific offset of the reference, (e.g., *x1-pointIndividualOffset* or *x-pointIndividualOffset* as defined within *measObjectEUTRA* corresponding to the frequency of the reference), and is set to zero if not configured for the reference.

*Hys* is the hysteresis parameter for this event.

*Off* is the offset parameter for this event (e.g., *x1-Offset* as defined within *reportConfigEUTRA* for this event).

*Mc, Mr* may be expressed in dB (e.g., if the channel condition is evaluated by path loss) or dBm (e.g., if the channel condition is evaluated by reference signal received power).

*Ofc, Opc, Ofr, Opr, Hys, Off* are expressed in dB.

*Candidate* is a point/cell/resource in the candidate list (e.g., *x1-Candidate-list* as defined within *reportConfigEUTRA* for this event, or *x-Candidate-list* as defined within *MeasObjectEUTRA* for this event).

*Reference* is a point/cell/resource the measured channel condition/path loss of which is used as the reference value in the comparison (e.g., *x1-Reference-index* as defined within *reportConfigEUTRA* for this event, or *x-Reference-index* as defined within *MeasObjectEUTRA* for this event), or a reference value which is used in the comparison (e.g., *x1-Reference-value* as defined within *reportConfigEUTRA* for this event, or *x-Reference-value* as defined within *MeasObjectEUTRA* for this event).

NOTE: In a preferred implementation of UL CoMP, a candidate may be configured/specified as a point/cell/resource which is in UL CoMP assessment set but not in UL CoMP cooperating set, and the reference may be configured/specified as the major reception point. The offset parameter may be configured as a positive value. The triggering of the event may be used to suggest adding a point into UL CoMP cooperating set.

5.5.4.x2    Event X2 (Candidate becomes at least offset better than the Reference)

The UE shall:

1> consider the entering condition for this event to be satisfied when condition X2-1, as specified below, is fulfilled;

1> consider the leaving condition for this event to be satisfied when condition X2-2, as specified below, is fulfilled;

NOTE    The Candidate that triggers the event is on the frequency (e.g., as indicated in the associated *measObject*) which may be different from the frequency used by the Reference.

Inequality X2-1 (Entering condition)

$$Mc + Ofc + Opc + Hys < Mr + Ofr + Opr - Off$$

Inequality X2-2 (Leaving condition)

$$Mc + Ofc + Opc - Hys > Mr + Ofr + Opr - Off$$

The variables in the formula are defined as follows:

*Mc* is the measurement result of the channel condition (e.g., path loss) of the candidate point/cell/resource, not taking into account any offsets.

*Ofc* is the frequency specific offset of the frequency of the candidate (e.g., *x2-offsetFreq* or *x-offsetFreq* as defined within *measObjectEUTRA* corresponding to the frequency of the candidate), and set to zero if not configured for the candidate.

*Opc* is the point/cell/resource specific offset of the candidate (e.g., *x2-pointIndividualOffset* or *x-pointIndividualOffset* as defined within *measObjectEUTRA* corresponding to the frequency of the candidate), and set to zero if not configured for the candidate.

*Mr* is the measurement result of channel condition (e.g., path loss) of the reference point/cell/resource, not taking into account any offsets.

*Ofr* is the frequency specific offset of the reference, (e.g., *x2-offsetFreq* or *x-offsetFreq* as defined within *measObjectEUTRA* corresponding to the frequency of the reference), and set to zero if not configured for the reference.

*Opr* is the point/cell/resource specific offset of the reference, (e.g., *x2-pointIndividualOffset* or *x-pointIndividualOffset* as defined within *measObjectEUTRA* corresponding to the frequency of the reference), and is set to zero if not configured for the reference.

*Hys* is the hysteresis parameter for this event.

*Off* is the offset parameter for this event (e.g., *x2-Offset* as defined within *reportConfigEUTRA* for this event).

*Mc, Mr* may be expressed in dB (e.g., if the channel condition is evaluated by path loss) or dBm (e.g., if the channel condition is evaluated by reference signal received power).

*Ofc, Opc, Ofr, Opr, Hys, Off* are expressed in dB.

*Candidate* is a point/cell/resource in the candidate list (e.g., *x2-Candidate-list* as defined within *reportConfigEUTRA* for this event, or *x-Candidate-list* as defined within *MeasObjectEUTRA* for this event).

*Reference* is a point/cell/resource the measured channel condition/path loss of which is used as the reference value in the comparison (e.g., *x2-Reference-index* as defined within *reportConfigEUTRA* for this event, or *x-Reference-index* as defined within *MeasObjectEUTRA* for this event), or a reference value which is used in the comparison (e.g., *x2-Reference-value* as defined within *reportConfigEUTRA* for this event, or *x-Reference-value* as defined within *MeasObjectEUTRA* for this event).

NOTE: In a preferred implementation of UL CoMP, a candidate may be configured/specified as a point/cell/resource which is in UL CoMP cooperating set but not the major reception point, and the reference may be configured/specified as the major reception point. The offset parameter may be configured as a positive value. The triggering of the event may be used to suggest changing the major reception point.

5.5.4.x3            Event X3 (Candidate becomes worse than the Reference by an offset)

The UE shall:

1> consider the entering condition for this event to be satisfied when condition X3-1, as specified below, is fulfilled;

1> consider the leaving condition for this event to be satisfied when condition X3-2, as specified below, is fulfilled;

NOTE    The Candidate that triggers the event is on the frequency (e.g., as indicated in the associated *measObject*) which may be different from the frequency used by the Reference.

Inequality X3-1 (Entering condition)

$$Mc + Ofc + Opc - Hys > Mr + Ofr + Opr + Off$$

Inequality X3-2 (Leaving condition)

$$Mc + Ofc + Opc + Hys < Mr + Ofr + Opr + Off$$

The variables in the formula are defined as follows:

*Mc* is the measurement result of the channel condition (e.g., path loss) of the candidate point/cell/resource, not taking into account any offsets.

*Ofc* is the frequency specific offset of the frequency of the candidate (e.g., *x3-offsetFreq* or *x-offsetFreq* as defined within *measObjectEUTRA* corresponding to the frequency of the candidate), and set to zero if not configured for the candidate.

*Opc* is the point/cell/resource specific offset of the candidate (e.g., *x3-pointIndividualOffset* or *x-pointIndividualOffset* as defined within *measObjectEUTRA* corresponding to the frequency of the candidate), and set to zero if not configured for the candidate.

*Mr* is the measurement result of channel condition (e.g., path loss) of the reference point/cell/resource, not taking into account any offsets.

*Ofr* is the frequency specific offset of the reference, (e.g., *x3-offsetFreq* or *x-offsetFreq* as defined within *measObjectEUTRA* corresponding to the frequency of the reference), and set to zero if not configured for the reference.

*Opr* is the point/cell/resource specific offset of the reference, (e.g., *x3-pointIndividualOffset* or *x-pointIndividualOffset* as defined within *measObjectEUTRA* corresponding to the frequency of the reference), and is set to zero if not configured for the reference.

*Hys* is the hysteresis parameter for this event.

*Off* is the offset parameter for this event (e.g., *x3-Offset* as defined within *reportConfigEUTRA* for this event).

*Mc, Mr* may be expressed in dB (e.g., if the channel condition is evaluated by path loss) or dBm (e.g., if the channel condition is evaluated by reference signal received power).

*Ofc, Opc, Ofr, Opr, Hys, Off* are expressed in dB.

*Candidate* is a point/cell/resource in the candidate list (e.g., *x3-Candidate-list* as defined within *reportConfigEUTRA* for this event, or *x-Candidate-list* as defined within *MeasObjectEUTRA* for this event).

*Reference* is a point/cell/resource the measured channel condition/path loss of which is used as the reference value in the comparison (e.g., *x3-Reference-index* as defined within *reportConfigEUTRA* for this event, or *x-Reference-index* as defined within *MeasObjectEUTRA* for this event), or a reference value which is used in the comparison (e.g., *x3-Reference-value* as defined within *reportConfigEUTRA* for this event, or *x-Reference-value* as defined within *MeasObjectEUTRA* for this event).

NOTE: In a preferred implementation of UL CoMP, a candidate may be configured/specified as a point/cell/resource which is in UL CoMP cooperating set, and the reference may be configured/specified as the major reception point. The offset parameter may be configured as a positive value. The triggering of the event may be used to suggest removing a point from UL CoMP cooperating set.

Note: *x1-offsetFreq* may have the same value as *x2-offsetFreq* and/or *x3-offsetFreq* for the same frequency, and *x1-pointIndividualOffset* may have the same value as *x2-pointIndividualOffset* and/or *x3-pointIndividualOffset* for the same point/cell/resource.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

*Modifications to Section 6.3.5*

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

*Example 1.1:*

-- One measurement object (*MeasObjectEUTRA*) per frequency;

-- Lists of candidate cells/points/resources and the reference value (or reference cell/point/resource) are configured in reporting configurations(ReportConfigEUTRA) respectively.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

*Modifications to ReportConfigEUTRA (in underlined italics)*

– *ReportConfigEUTRA*

The IE *ReportConfigEUTRA* specifies criteria for triggering of an E-UTRA measurement reporting event. The E-UTRA measurement reporting events are labelled A*N* with *N* equal to 1, 2 and so on, *or are labeled XN with N equal to 1, 2 and so on*.

Event A1: Serving becomes better than absolute threshold;

Event A2: Serving becomes worse than absolute threshold;

Event A3: Neighbour becomes amount of offset better than PCell;

Event A4: Neighbour becomes better than absolute threshold;

Event A5: PCell becomes worse than absolute threshold1 AND Neighbour becomes better than another absolute threshold2.

Event A6: Neighbour becomes amount of offset better than SCell.

*Event X1: Candidate becomes no worse than the Reference by an offset.*

*Event X2: Candidate becomes at least offset better than the Reference.*

*Event X3: Candidate becomes worse than the Reference by an offset.*

ReportConfigEUTRA information element

```
-- ASN1START

ReportConfigEUTRA ::=           SEQUENCE {
    triggerType                     CHOICE {
        event                           SEQUENCE {
            eventId                         CHOICE {
                eventA1                         SEQUENCE {
```

```
        a1-Threshold                    ThresholdEUTRA
    },
    eventA2                             SEQUENCE {
        a2-Threshold                    ThresholdEUTRA
    },
    eventA3                             SEQUENCE {
        a3-Offset                       INTEGER (-30..30),
        reportOnLeave                   BOOLEAN
    },
    eventA4                             SEQUENCE {
        a4-Threshold                    ThresholdEUTRA
    },
    eventA5                             SEQUENCE {
        a5-Threshold1                   ThresholdEUTRA,
        a5-Threshold2                   ThresholdEUTRA
    },
    ...,
    eventA6-r10                         SEQUENCE {
        a6-Offset-r10                   INTEGER (-30..30),
        a6-ReportOnLeave-r10            BOOLEAN
    },
    eventX1                             SEQUENCE {
        x1-Offset                       INTEGER (X1_MIN..X1_MAX),
        reportOnLeave                   BOOLEAN,
        x1-Candidate-list               CellIndexList           OPTIONAL,
        x1-Reference-index              CellIndex               OPTIONAL,
        x1-Reference-value              INTEGER (REF_MIN..REF_MAX)  OPTIONAL
    },
    eventX2                             SEQUENCE {
        x2-Offset                       INTEGER (X2_MIN..X2_MAX),
        reportOnLeave                   BOOLEAN,
        x2-Candidate-list               CellIndexList           OPTIONAL,
        x2-Reference-index              CellIndex               OPTIONAL,
        x2-Reference-value              INTEGER (REF_MIN..REF_MAX)  OPTIONAL
    },
    eventX3                             SEQUENCE {
```

```
            x3-Offset                    INTEGER (X3_MIN..X3_MAX),
            reportOnLeave                BOOLEAN,
            x3-Candidate-list            CellIndexList            OPTIONAL,
            x3-Reference-index           CellIndex                OPTIONAL,
            x3-Reference-value           INTEGER (REF_MIN..REF_MAX) OPTIONAL
            }
        },
        hysteresis                       Hysteresis,
        timeToTrigger                    TimeToTrigger
    },
    periodical                           SEQUENCE {
        purpose                              ENUMERATED {
                                                 reportStrongestCells, reportCGI}
        }
    },
    triggerQuantity                      ENUMERATED {rsrp, rsrq, cc-rsrp, cc-rsrq},
    reportQuantity                       ENUMERATED {sameAsTriggerQuantity, both},
    maxReportCells                       INTEGER (1..maxCellReport),
    reportInterval                       ReportInterval,
    reportAmount                         ENUMERATED {r1, r2, r4, r8, r16, r32, r64, infinity},
    ...,
    [[ si-RequestForHO-r9                ENUMERATED {setup}    OPTIONAL,   -- Cond reportCGI
       ue-RxTxTimeDiffPeriodical-r9      ENUMERATED {setup}    OPTIONAL    -- Need OR
    ]],
    [[ includeLocationInfo-r10           ENUMERATED {true}     OPTIONAL,   -- Cond reportMDT
       reportAddNeighMeas-r10            ENUMERATED {setup}    OPTIONAL    -- Need OR
    ]]
}

ThresholdEUTRA ::=               CHOICE{
    threshold-RSRP                   RSRP-Range,
    threshold-RSRQ                   RSRQ-Range,
    threshold-cc-RSRP                INTEGER (CC_RSRP_MIN..CC_RSRP_MAX),
    threshold-cc-RSRQ                INTEGER (CC_RSRQ_MIN..CC_RSRQ_MAX)
}
```

-- ASN1STOP

| ReportConfigEUTRA field descriptions |
|---|
| *a3-Offset/ a6-Offset*<br><br>Offset value to be used in EUTRA measurement report triggering condition for event a3/a6. The actual value is IE value * 0.5 dB. |
| *x1-Offset/ x2-Offset/x3-Offset*<br><br>Offset value to be used in EUTRA measurement report triggering condition for event x1/x2/x3. The actual value may be a function of the IE value, e.g., IE value * 0.5 dB. |
| *X1_MIN/X2_MIN/X3_MIN*<br><br>The minimum value that can be taken by x1-Offset/ x2-Offset/x3-Offset. It may be replaced by actual numbers, too. |
| *X1_MAX/X2_MAX/X3_MAX*<br><br>The maximum value that can be taken by x1-Offset/ x2-Offset/x3-Offset. It may be replaced by actual numbers, too. |
| *x1-Candidate-list/ x2-Candidate-list/ x3-Candidate-list*<br><br>List of cells/points/resources to be considered as candidate for the triggering of event x1/x2/x3. |
| *x1-Reference-index / x2- Reference-index / x3- Reference-index*<br><br>Index of the cell/point/resource whose measured channel condition/path loss is used as the reference value in the triggering condition evaluation of event x1/x2/x3. |

| ReportConfigEUTRA field descriptions |
|---|
| *x1-Reference-value/ x2- Reference-value/ x3- Reference-value* <br><br> The reference value which is used in the triggering condition evaluation of event x1/x2/x3. The actual value may be a function of the IE value, e.g., IE value * 0.5 dB. If the field x1-Reference-index / x2- Reference-index / x3- Reference-index is included in the IE, this field shall be neglected. |
| *REF_MIN* <br><br> The minimum value that can be taken by x1-Reference-value/ x2- Reference-valu / x3- Reference-value. It may be replaced by actual numbers, too. |
| *REF_MAX* <br><br> The maximum value that can be taken by x1-Reference-value/ x2- Reference-valu / x3- Reference-value. It may be replaced by actual numbers, too. |
| *aN-ThresholdM* <br><br> Threshold to be used in EUTRA measurement report triggering condition for event number aN. If multiple thresholds are defined for event number aN, the thresholds are differentiated by M. |
| *eventId* <br><br> Choice of E-UTRA event triggered reporting criteria. |
| *maxReportCells* <br><br> Max number of cells, excluding the serving cell, to include in the measurement report. |
| *reportAmount* <br><br> Number of measurement reports applicable for *triggerType event* as well as for *triggerType periodical*. In case *purpose* is set to *reportCGI* only value 1 applies. |

| ReportConfigEUTRA field descriptions |
|---|
| reportOnLeave/ a6-ReportOnLeave <br><br> Indicates whether or not the UE shall initiate the measurement reporting procedure when the leaving condition is met for a cell in *cellsTriggeredList*, as specified in 5.5.4.1. |
| reportQuantity <br><br> The quantities to be included in the measurement report. The value both means that both the rsrp and rsrq quantities are to be included in the measurement report, *or both the cc-rsrp and cc-rsrq quantities are to be included in the measurement report*. |
| si-RequestForHO <br><br> The field applies to the *reportCGI* functionality, and when the field is included, the UE is allowed to use autonomous gaps in acquiring system information from the neighbour cell, applies a different value for T321, and includes different fields in the measurement report. |
| ThresholdEUTRA <br><br> For RSRP: RSRP based threshold for event evaluation. The actual value is IE value − 140 dBm. <br><br> For RSRQ: RSRQ based threshold for event evaluation. The actual value is (IE value − 40)/2 dB. <br><br> *For cc-RSRP: cc-RSRP based threshold for event evaluation.* <br><br> *For cc-RSRQ: cc-RSRQ based threshold for event evaluation.* |
| CC_RSRP_MIN/ CC_RSRQ_MIN <br><br> *The minimum value that can be taken by cc-RSRP/ cc-RSRQ. It may be replaced by actual numbers, too.* |

| ReportConfigEUTRA field descriptions |
|---|
| _CC_RSRP_MAX/ CC_RSRQ_MAX_ <br><br> _The maximum value that can be taken by cc-RSRP/ cc-RSRQ. It may be replaced by actual numbers, too._ |
| timeToTrigger <br><br> Time during which specific criteria for the event needs to be met in order to trigger a measurement report. |
| triggerQuantity <br><br> The quantities used to evaluate the triggering condition for the event. The values rsrp and rsrq correspond to Reference Signal Received Power (RSRP) and Reference Signal Received Quality (RSRQ), see TS 36.214 [48]. _The values cc-rsrp and cc- rsrq correspond to the channel conditions derived from RSRP and RSRQ measurements._ |
| ue-RxTxTimeDiffPeriodical <br><br> If this field is present, the UE shall perform UE Rx-Tx time difference measurement reporting and ignore the fields *triggerQuantity*, *reportQuantity* and *maxReportCells*. If the field is present, the only applicable values for the corresponding *triggerType* and *purpose* are periodical and reportStrongestCells respectively. |

......

*Modifications to MeasObjectEUTRA (in underlined italics)*

– *MeasObjectEUTRA*

The IE *MeasObjectEUTRA* specifies information applicable for intra-frequency or inter-frequency E-UTRA cells.

MeasObjectEUTRA information element

```
-- ASN1START

MeasObjectEUTRA ::=             SEQUENCE {
    carrierFreq                 ARFCN-ValueEUTRA,
    allowedMeasBandwidth        AllowedMeasBandwidth,
    presenceAntennaPort1        PresenceAntennaPort1,
    neighCellConfig             NeighCellConfig,
    offsetFreq                  Q-OffsetRange           DEFAULT dB0,
    x1-offsetFreq               Q-OffsetRange           DEFAULT dB0,
    x2-offsetFreq               Q-OffsetRange           DEFAULT dB0,
    x3-offsetFreq               Q-OffsetRange           DEFAULT dB0,
    -- Cell list
    cellsToRemoveList           CellIndexList           OPTIONAL,   -- Need ON
    cellsToAddModList           CellsToAddModList       OPTIONAL,   -- Need ON
    -- Black list
    blackCellsToRemoveList      CellIndexList           OPTIONAL,   -- Need ON
    blackCellsToAddModList      BlackCellsToAddModList  OPTIONAL,   -- Need ON
    cellForWhichToReportCGI     PhysCellId              OPTIONAL,   -- Need ON
    ...,
    [[measCycleSCell-r10        MeasCycleSCell-r10      OPTIONAL,   -- Need ON
      measSubframePatternConfigNeigh-r10  MeasSubframePatternConfigNeigh-r10  OPTIONAL
            -- Need ON
    ]]
}

CellsToAddModList ::=           SEQUENCE (SIZE (1..maxCellMeas)) OF CellsToAddMod CellsToAddMod ::=   SEQUENCE {
```

```
    cellIndex                           INTEGER (1..maxCellMeas),
    physCellId                          PhysCellId,
    cellIndividualOffset                Q-OffsetRange,
    x1-pointIndividualOffset            Q-OffsetRange,
    x2-pointIndividualOffset            Q-OffsetRange,
    x3-pointIndividualOffset            Q-OffsetRange
}

BlackCellsToAddModList ::=          SEQUENCE (SIZE (1..maxCellMeas)) OF BlackCellsToAddMod BlackCellsToAddMod ::=   SEQUENCE {
    cellIndex                           INTEGER (1..maxCellMeas),
    physCellIdRange                     PhysCellIdRange
}

MeasCycleSCell-r10 ::=              ENUMERATED {sf160, sf256, sf320, sf512,
                                                sf640, sf1024, sf1280, spare1}

MeasSubframePatternConfigNeigh-r10 ::= CHOICE {
    release                             NULL,
    setup                               SEQUENCE {
        measSubframePatternNeigh-r10        MeasSubframePattern-r10,
        measSubframeCellList-r10            MeasSubframeCellList-r10   OPTIONAL   -- Cond measSubframe
    }
}

MeasSubframeCellList-r10 ::=    SEQUENCE (SIZE (1..maxCellMeas)) OF PhysCellIdRange

-- ASN1STOP
```

| MeasObjectEUTRA field descriptions |
|---|
| blackCellsToAddMoList<br><br>List of cells to add/ modify in the black list of cells. |
| blackCellsToRemoveList<br><br>List of cells to remove from the black list of cells. |
| carrierFreq<br><br>Identifies E-UTRA carrier frequency for which this configuration is valid. |
| cellIndex<br><br>Entry index in the cell list. An entry may concern a range of cells, in which case this value applies to the entire range. |
| cellIndividualOffset<br><br>Cell individual offset applicable to a specific cell. Value dB-24 corresponds to -24 dB, dB-22 corresponds to -22 dB and so on. |
| <u>x1-pointIndividualOffset/ x2-pointIndividualOffset/ x3-pointIndividualOffset</u><br><br><u>Point/cell/resource individual offset applicable to a specific point/cell/resource in EUTRA measurement report triggering condition for event x1/x2/x3. Value dB-24 corresponds to -24 dB, dB-22 corresponds to -22 dB and so on.</u> |
| cellsToAddModList<br><br>List of cells to add/ modify in the cell list. |
| cellsToRemoveList<br><br>List of cells to remove from the cell list. |

| MeasObjectEUTRA field descriptions |
|---|
| *measCycleSCell* |
| Parameter: $T_{measure\_scc}$ See TS 36.133 [16, 8.3.3]. The parameter is used only when an SCell is configured on the frequency indicated by the *measObject* and is in deactivated state, but the field may also be signalled when an SCell is not configured. Value *sf160* corresponds to 160 sub-frames, *sf256* corresponds to 256 sub-frames and so on. |
| *measSubframeCellList* |
| List of cells for which *measSubframePatternNeigh* is applied. |
| *measSubframePatternNeigh* |
| Time domain measurement resource restriction pattern applicable to neighbour cell RSRP and RSRQ measurements on the carrier frequency indicated by *carrierFreq*. If MBSFN configuration of neighbour cells is unknown or not uniquely defined then for cells in *measSubframeCellList* the UE shall assume that the subframes indicated by *measSubframePatternNeigh* are non-MBSFN subframes. |
| *offsetFreq* |
| Offset value applicable to the carrier frequency. Value dB-24 corresponds to -24 dB, dB-22 corresponds to -22 dB and so on. |
| *x1-offsetFreq/ x2-offsetFreq/ x3-offsetFreq/* <br> *Offset value applicable to the carrier frequency in EUTRA measurement report triggering condition for event x1/x2/x3. Value dB-24 corresponds to -24 dB, dB-22 corresponds to -22 dB and so on.* |
| *physCellId* |
| Physical cell identity of a cell in the cell list. |

| MeasObjectEUTRA field descriptions |
|---|
| physCellIdRange |
| Physical cell identity or a range of physical cell identities of cells in the black list. |

......

*Modifications to MeasResults (in underlined italics)*

- *MeasResults*

The IE *MeasResults* covers measured results for intra-frequency, inter-frequency and inter-RAT mobility.

*MeasResults* information element

```
-- ASN1START

MeasResults ::=                     SEQUENCE {
    measId                          MeasId,
    measResultPCell                 SEQUENCE {
        rsrpResult                  RSRP-Range,
        rsrqResult                  RSRQ-Range,
        cc-RSRPResult               INTEGER (CC_RSRP_MIN..CC_RSRP_MAX),
        cc-RSRQResult               INTEGER (CC_RSRQ_MIN..CC_RSRQ_MAX)
    },
    measResultNeighCells            CHOICE {
        measResultListEUTRA         MeasResultListEUTRA,
        measResultListUTRA          MeasResultListUTRA,
        measResultListGERAN         MeasResultListGERAN,
        measResultsCDMA2000         MeasResultsCDMA2000,
        ...
    }                                                       OPTIONAL,
```

```
    ...,
    [[ measResultForECID-r9          MeasResultForECID-r9          OPTIONAL
    ]],
    [[ locationInfo-r10              LocationInfo-r10              OPTIONAL,
        measResultServFreqList-r10   MeasResultServFreqList-r10    OPTIONAL
    ]]
}

MeasResultListEUTRA ::=             SEQUENCE (SIZE (1..maxCellReport)) OF MeasResultEUTRA MeasResultEUTRA ::= SEQUENCE {
    physCellId                      PhysCellId,
    cgi-Info                        SEQUENCE {
        cellGlobalId                    CellGlobalIdEUTRA,
        trackingAreaCode                TrackingAreaCode,
        plmn-IdentityList               PLMN-IdentityList2            OPTIONAL
    }                                                                 OPTIONAL,
    measResult                      SEQUENCE {
        rsrpResult                      RSRP-Range                    OPTIONAL,
        rsrqResult                      RSRQ-Range                    OPTIONAL,
        cc-RSRPResult                   INTEGER (CC_RSRP_MIN..CC_RSRP_MAX)  OPTIONAL,
        cc-RSRQResult                   INTEGER (CC_RSRQ_MIN..CC_RSRQ_MAX)  OPTIONAL,
        ...,
        [[ additionalSI-Info-r9         AdditionalSI-Info-r9          OPTIONAL
        ]]
    }
}

MeasResultServFreqList-r10 ::=  SEQUENCE (SIZE (1..maxServCell-r10)) OF MeasResultServFreq-r10

MeasResultServFreq-r10 ::=          SEQUENCE {
    servFreqId-r10                  ServCellIndex-r10,
    measResultSCell-r10             SEQUENCE {
        rsrpResultSCell-r10             RSRP-Range,
        rsrqResultSCell-r10             RSRQ-Range
    }                                                                 OPTIONAL,
```

```
        measResultBestNeighCell-r10        SEQUENCE {
            physCellId-r10                 PhysCellId,
            rsrpResultNCell-r10            RSRP-Range,
            rsrqResultNCell-r10            RSRQ-Range
        }                                                                   OPTIONAL,
        ...
}

MeasResultListUTRA ::=                 SEQUENCE (SIZE (1..maxCellReport)) OF MeasResultUTRA MeasResultUTRA ::=    SEQUENCE {
    physCellId                         CHOICE {
        fdd                                PhysCellIdUTRA-FDD,
        tdd                                PhysCellIdUTRA-TDD
    },
    cgi-Info                           SEQUENCE {
        cellGlobalId                       CellGlobalIdUTRA,
        locationAreaCode                   BIT STRING (SIZE (16))           OPTIONAL,
        routingAreaCode                    BIT STRING (SIZE (8))            OPTIONAL,
        plmn-IdentityList                  PLMN-IdentityList2               OPTIONAL
    }                                                                       OPTIONAL,
    measResult                         SEQUENCE {
        utra-RSCP                          INTEGER (-5..91)                 OPTIONAL,
        utra-EcN0                          INTEGER (0..49)                  OPTIONAL,
        ...,
        [[ additionalSI-Info-r9            AdditionalSI-Info-r9             OPTIONAL
        ]]
    }
}

MeasResultListGERAN ::=                SEQUENCE (SIZE (1..maxCellReport)) OF MeasResultGERAN MeasResultGERAN ::= SEQUENCE {
    carrierFreq                        CarrierFreqGERAN,
    physCellId                         PhysCellIdGERAN,
    cgi-Info                           SEQUENCE {
```

```
        cellGlobalId                  CellGlobalIdGERAN,
        routingAreaCode               BIT STRING (SIZE (8))        OPTIONAL
    }                                                              OPTIONAL,
    measResult                    SEQUENCE {
        rssi                          INTEGER (0..63),
        ...
    }
}

MeasResultsCDMA2000 ::=           SEQUENCE {
    preRegistrationStatusHRPD        BOOLEAN,
    measResultListCDMA2000           MeasResultListCDMA2000
}

MeasResultListCDMA2000 ::=        SEQUENCE (SIZE (1..maxCellReport)) OF MeasResultCDMA2000

MeasResultCDMA2000 ::=  SEQUENCE {
    physCellId                    PhysCellIdCDMA2000,
    cgi-Info                      CellGlobalIdCDMA2000           OPTIONAL,
    measResult                    SEQUENCE {
        pilotPnPhase                  INTEGER (0..32767)         OPTIONAL,
        pilotStrength                 INTEGER (0..63),
        ...
    }
}

MeasResultForECID-r9 ::=        SEQUENCE {
    ue-RxTxTimeDiffResult-r9         INTEGER (0..4095),
    currentSFN-r9                    BIT STRING (SIZE (10))
}

PLMN-IdentityList2 ::=           SEQUENCE (SIZE (1..5)) OF PLMN-Identity

AdditionalSI-Info-r9 ::=         SEQUENCE {
    csg-MemberStatus-r9              ENUMERATED {member}            OPTIONAL,
    csg-Identity-r9                  CSG-Identity                   OPTIONAL
```

| MeasResults field descriptions |
|---|
| csg-MemberStatus<br><br>Indicates whether or not the UE is a member of the CSG of the neighbour cell. |
| currentSFN<br><br>Indicates the current system frame number when receiving the UE Rx-Tx time difference measurement results from lower layer. |
| locationAreaCode<br><br>A fixed length code identifying the location area within a PLMN, as defined in TS 23.003 [27]. |
| measId<br><br>Identifies the measurement identity for which the reporting is being performed. |
| measResult<br><br>Measured result of an E-UTRA cell;<br><br>Measured result of a UTRA cell;<br><br>Measured result of a GERAN cell or frequency; or<br><br>Measured result of a CDMA2000 cell.<br><br>Measured result of UE Rx–Tx time difference. |
| measResultListCDMA2000<br><br>List of measured results for the maximum number of reported best cells for a CDMA2000 measurement identity. |
| measResultListEUTRA<br><br>List of measured results for the maximum number of reported best cells for an E-UTRA measurement identity. |

| *MeasResults* field descriptions |
| --- |
| *measResultListGERAN*<br>List of measured results for the maximum number of reported best cells or frequencies for a GERAN measurement identity. |
| *measResultListUTRA*<br>List of measured results for the maximum number of reported best cells for a UTRA measurement identity. |
| *measResultPCell*<br>Measured result of the PCell. |
| measResultsCDMA2000<br>Contains the CDMA2000 HRPD pre-registration status and the list of CDMA2000 measurements. |

| MeasResults field descriptions |
|---|
| MeasResultServFreqList<br>Measured results of the serving frequencies: the measurement result of each SCell, if any, and of the best neighbouring cell on each serving frequency. |
| pilotPnPhase<br>Indicates the arrival time of a CDMA2000 pilot, measured relative to the UE's time reference in units of PN chips, see C.S0005-A [25]. This information is used in either SRVCC handover or enhanced 1xRTT CS fallback procedure to CDMA2000 1xRTT. |
| pilotStrength<br>CDMA2000 Pilot Strength, the ratio of pilot power to total power in the signal bandwidth of a CDMA2000 Forward Channel. See C.S0005-A [25] for CDMA2000 1xRTT and C.S0024-A [26] for CDMA2000 HRPD. |
| plmn-IdentityList<br>The list of PLMN Identity read from broadcast information when the multiple PLMN Identities are broadcast. This field contains the list of identities starting from the second entry of PLMN Identities in the broadcast information. |
| preRegistrationStatusHRPD<br>Set to TRUE if the UE is currently pre-registered with CDMA2000 HRPD. Otherwise set to FALSE. This can be ignored by the eNB for CDMA2000 1xRTT. |

| MeasResults field descriptions |
|---|
| routingAreaCode <br><br> The RAC identity read from broadcast information, as defined in TS 23.003 [27]. |
| rsrpResult <br><br> Measured RSRP result of an E-UTRA cell. <br><br> The rsrpResult is only reported if configured by the eNB. |
| rsrqResult <br><br> Measured RSRQ result of an E-UTRA cell. <br><br> The rsrqResult is only reported if configured by the eNB. |
| cc-rsrpResult <br><br> Measured/derived cc-RSRP result of an E-UTRA cell. <br><br> The cc-rsrpResult is only reported if configured by the eNB. |
| cc-rsrqResult <br><br> Measured/derived cc-RSRQ result of an E-UTRA cell. <br><br> The cc-rsrqResult is only reported if configured by the eNB. |
| rssi <br><br> GERAN Carrier RSSI. RXLEV is mapped to a value between 0 and 63, TS 45.008 [28]. <br><br> When mapping the RXLEV value to the RSSI bit string, the first/leftmost bit of the bit string contains the most significant bit. |
| ue-RxTxTimeDiffResult <br><br> UE Rx-Tx time difference measurement result of the PCell, provided by lower layers. <br><br> According to UE Rx-Tx time difference report mapping in TS 36.133 [16]. |

| MeasResults field descriptions |
| --- |
| utra-EcN0<br>According to CPICH_Ec/No in TS 25.133 [29] for FDD. Fourteen spare values. The field is not present for TDD. |
| utra-RSCP<br>According to CPICH_RSCP in TS 25.133 [29] for FDD and P-CCPCH_RSCP in TS 25.123 [30] for TDD. Thirty-one spare values. |

......

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

*Example 1.2:*

-- Multiple measurement objects (MeasObjectEUTRA) per frequency;

-- Lists of candidate cells/points/resources and the reference value (or reference cell/point/resource) are configured in measurement objects (MeasObjectEUTRA) respectively.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

*Modifications to ReportConfigEUTRA (in underlined italics)*

– *ReportConfigEUTRA*

The IE *ReportConfigEUTRA* specifies criteria for triggering of an E-UTRA measurement reporting event. The E-UTRA measurement reporting events are labelled A$N$ with $N$ equal to 1, 2 and so on, *or are labeled XN with N equal to 1, 2 and so on*.

Event A1:  Serving becomes better than absolute threshold;

Event A2:  Serving becomes worse than absolute threshold;

Event A3:  Neighbour becomes amount of offset better than PCell;

Event A4:  Neighbour becomes better than absolute threshold;

Event A5:  PCell becomes worse than absolute threshold1 AND Neighbour becomes better than another absolute threshold2.

Event A6:  Neighbour becomes amount of offset better than SCell.

*Event X1:  Candidate becomes no worse than the Reference by an offset.*

*Event X2:  Candidate becomes at least offset better than the Reference.*

*Event X3:  Candidate becomes worse than the Reference by an offset.*

ReportConfigEUTRA information element

```
-- ASN1START

ReportConfigEUTRA ::=           SEQUENCE {
    triggerType                     CHOICE {
        event                           SEQUENCE {
            eventId                         CHOICE {
                eventA1                         SEQUENCE {
                    a1-Threshold                    ThresholdEUTRA
                },
                eventA2                         SEQUENCE {
                    a2-Threshold                    ThresholdEUTRA
                },
                eventA3                         SEQUENCE {
                    a3-Offset                       INTEGER (-30..30),
```

```
            reportOnLeave                   BOOLEAN
        },
        eventA4                             SEQUENCE {
            a4-Threshold                    ThresholdEUTRA
        },
        eventA5                             SEQUENCE {
            a5-Threshold1                   ThresholdEUTRA,
            a5-Threshold2                   ThresholdEUTRA
        },
        ...,
        eventA6-r10                         SEQUENCE {
            a6-Offset-r10                   INTEGER (-30..30),
            a6-ReportOnLeave-r10            BOOLEAN
        },
        eventX1                             SEQUENCE {
            x1-Offset                       INTEGER (X1_MIN..X1_MAX),
            reportOnLeave                   BOOLEAN
        },
        eventX2                             SEQUENCE {
            x2-Offset                       INTEGER (X2_MIN..X2_MAX),
            reportOnLeave                   BOOLEAN
        },
        eventX3                             SEQUENCE {
            x3-Offset                       INTEGER (X3_MIN..X3_MAX),
            reportOnLeave                   BOOLEAN
        }
    },
    hysteresis                              Hysteresis,
    timeToTrigger                           TimeToTrigger
},
periodical                                  SEQUENCE {
    purpose                                 ENUMERATED {
                                                reportStrongestCells, reportCGI}
    }
},
triggerQuantity                             ENUMERATED {rsrp, rsrq, cc_rsrp, cc_rsrq},
```

```
    reportQuantity                    ENUMERATED {sameAsTriggerQuantity, both},
    maxReportCells                    INTEGER (1..maxCellReport),
    reportInterval                    ReportInterval,
    reportAmount                      ENUMERATED {r1, r2, r4, r8, r16, r32, r64, infinity},
    ...,
    [[ si-RequestForHO-r9             ENUMERATED {setup}   OPTIONAL,   -- Cond reportCGI
       ue-RxTxTimeDiffPeriodical-r9   ENUMERATED {setup}   OPTIONAL    -- Need OR
    ]],
    [[ includeLocationInfo-r10        ENUMERATED {true}    OPTIONAL,   -- Cond reportMDT
       reportAddNeighMeas-r10         ENUMERATED {setup}   OPTIONAL    -- Need OR
    ]]
}

ThresholdEUTRA ::=                    CHOICE{
    threshold-RSRP                    RSRP-Range,
    threshold-RSRQ                    RSRQ-Range,
    threshold-cc-RSRP                 INTEGER (CC_RSRP_MIN..CC_RSRP_MAX),
    threshold-cc-RSRQ                 INTEGER (CC_RSRQ_MIN..CC_RSRQ_MAX)
}

-- ASN1STOP
```

| ReportConfigEUTRA field descriptions |
|---|
| a3-Offset/ a6-Offset<br><br>Offset value to be used in EUTRA measurement report triggering condition for event a3/a6. The actual value is IE value * 0.5 dB. |
| _x1-Offset/ x2-Offset/x3-Offset_<br><br>_Offset value to be used in EUTRA measurement report triggering condition for event x1/x2/x3. The actual value may be a function of the IE value, e.g., IE value * 0.5 dB._ |
| _X1_MIN/X2_MIN/X3_MIN_<br><br>_The minimum value that can be taken by x1-Offset/ x2-Offset/x3-Offset. It may be replaced by actual numbers, too._ |
| _X1_MAX/X2_MAX/X3_MAX_<br><br>_The maximum value that can be taken by x1-Offset/ x2-Offset/x3-Offset. It may be replaced by actual numbers, too._ |
| aN-ThresholdM<br><br>Threshold to be used in EUTRA measurement report triggering condition for event number aN. If multiple thresholds are defined for event number aN, the thresholds are differentiated by M. |
| eventId<br><br>Choice of E-UTRA event triggered reporting criteria. |
| maxReportCells<br><br>Max number of cells, excluding the serving cell, to include in the measurement report. |

| ReportConfigEUTRA field descriptions |
|---|
| reportAmount |
| Number of measurement reports applicable for *triggerType event* as well as for *triggerType periodical*. In case *purpose* is set to *reportCGI* only value 1 applies. |
| reportOnLeave/ a6-ReportOnLeave |
| Indicates whether or not the UE shall initiate the measurement reporting procedure when the leaving condition is met for a cell in *cellsTriggeredList*, as specified in 5.5.4.1. |
| reportQuantity |
| The quantities to be included in the measurement report. The value both means that both the rsrp and rsrq quantities are to be included in the measurement report, *or both the cc-rsrp and cc-rsrq quantities are to be included in the measurement report*. |
| si-RequestForHO |
| The field applies to the *reportCGI* functionality, and when the field is included, the UE is allowed to use autonomous gaps in acquiring system information from the neighbour cell, applies a different value for T321, and includes different fields in the measurement report. |
| ThresholdEUTRA |
| For RSRP: RSRP based threshold for event evaluation. The actual value is IE value − 140 dBm. |
| For RSRQ: RSRQ based threshold for event evaluation. The actual value is (IE value − 40)/2 dB. |
| *For cc-RSRP: cc-RSRP based threshold for event evaluation.* |
| *For cc-RSRQ: cc-RSRQ based threshold for event evaluation.* |

| ReportConfigEUTRA field descriptions |
|---|
| *CC_RSRP_MIN/ CC_RSRQ_MIN* <br><br> *The minimum value that can be taken by cc-RSRP/ cc-RSRQ. It may be replaced by actual numbers, too.* |
| *CC_RSRP_MAX/ CC_RSRQ_MAX* <br><br> *The maximum value that can be taken by cc-RSRP/ cc-RSRQ. It may be replaced by actual numbers, too.* |
| *timeToTrigger* <br><br> Time during which specific criteria for the event needs to be met in order to trigger a measurement report. |
| *triggerQuantity* <br><br> The quantities used to evaluate the triggering condition for the event. The values rsrp and rsrq correspond to Reference Signal Received Power (RSRP) and Reference Signal Received Quality (RSRQ), see TS 36.214 [48]. *The values cc-rsrp and cc- rsrq correspond to the channel conditions derived from RSRP and RSRQ measurements.* |
| *ue-RxTxTimeDiffPeriodical* <br><br> If this field is present, the UE shall perform UE Rx-Tx time difference measurement reporting and ignore the fields *triggerQuantity*, *reportQuantity* and *maxReportCells*. If the field is present, the only applicable values for the corresponding *triggerType* and *purpose* are periodical and reportStrongestCells respectively. |

......

*Modifications to MeasObjectEUTRA (in underlined italics)*

– *MeasObjectEUTRA*

The IE *MeasObjectEUTRA* specifies information applicable for intra-frequency or inter-frequency E-UTRA cells.

MeasObjectEUTRA information element

```
-- ASN1START

MeasObjectEUTRA ::=           SEQUENCE {
    carrierFreq               ARFCN-ValueEUTRA,
    allowedMeasBandwidth      AllowedMeasBandwidth,
    presenceAntennaPort1      PresenceAntennaPort1,
    neighCellConfig           NeighCellConfig,
    offsetFreq                Q-OffsetRange          DEFAULT dB0,
    x-offsetFreq              Q-OffsetRange          DEFAULT dB0,
    -- Cell list
    cellsToRemoveList         CellIndexList          OPTIONAL,    -- Need ON
    cellsToAddModList         CellsToAddModList      OPTIONAL,    -- Need ON
    x-Candidate-list          CellIndexList          OPTIONAL,
    x-Reference-index         CellIndex              OPTIONAL,
    x-Reference-value         INTEGER (REF_MIN..REF_MAX) OPTIONAL,
    -- Black list
    blackCellsToRemoveList    CellIndexList          OPTIONAL,    -- Need ON
    blackCellsToAddModList    BlackCellsToAddModList OPTIONAL,    -- Need ON
    cellForWhichToReportCGI   PhysCellId             OPTIONAL,    -- Need ON
    ...,
    [[measCycleSCell-r10      MeasCycleSCell-r10     OPTIONAL,    -- Need ON
      measSubframePatternConfigNeigh-r10  MeasSubframePatternConfigNeigh-r10  OPTIONAL
                              -- Need ON
    ]]
}

CellsToAddModList ::=         SEQUENCE (SIZE (1..maxCellMeas)) OF CellsToAddMod
```

```
CellsToAddMod ::=     SEQUENCE {
    cellIndex                     INTEGER (1..maxCellMeas),
    physCellId                    PhysCellId,
    cellIndividualOffset          Q-OffsetRange,
    x-pointIndividualOffset       Q-OffsetRange
}

BlackCellsToAddModList ::=        SEQUENCE (SIZE (1..maxCellMeas)) OF BlackCellsToAddMod BlackCellsToAddMod ::= SEQUENCE {
    cellIndex                     INTEGER (1..maxCellMeas),
    physCellIdRange               PhysCellIdRange
}

MeasCycleSCell-r10 ::=            ENUMERATED {sf160, sf256, sf320, sf512,
                                              sf640, sf1024, sf1280, spare1}

MeasSubframePatternConfigNeigh-r10 ::= CHOICE {
    release                       NULL,
    setup                         SEQUENCE {
        measSubframePatternNeigh-r10      MeasSubframePattern-r10,
        measSubframeCellList-r10          MeasSubframeCellList-r10   OPTIONAL   -- Cond
measSubframe
    }
}

MeasSubframeCellList-r10 ::=   SEQUENCE (SIZE (1..maxCellMeas)) OF PhysCellIdRange

-- ASN1STOP
```

| MeasObjectEUTRA field descriptions |
|---|
| blackCellsToAddMoList |
| List of cells to add/ modify in the black list of cells. |
| blackCellsToRemoveList |
| List of cells to remove from the black list of cells. |
| carrierFreq |
| Identifies E-UTRA carrier frequency for which this configuration is valid. |
| cellIndex |
| Entry index in the cell list. An entry may concern a range of cells, in which case this value applies to the entire range. |
| cellIndividualOffset |
| Cell individual offset applicable to a specific cell. Value dB-24 corresponds to -24 dB, dB-22 corresponds to -22 dB and so on. |
| x-pointIndividualOffset |
| Point/cell/resource individual offset applicable to a specific point/cell/resource in EUTRA measurement report triggering condition for the X-event (e.g., x1, x2, or x3) which is associated with the MeasObjectEUTRA. Value dB-24 corresponds to -24 dB, dB-22 corresponds to -22 dB and so on. |
| cellsToAddModList |
| List of cells to add/ modify in the cell list. |
| cellsToRemoveList |
| List of cells to remove from the cell list. |

| MeasObjectEUTRA field descriptions |
|---|
| *x-Candidate-list*<br><br>List of cells/points/resources to be considered as candidate for the triggering of the X-event (e.g., x1, x2, or x3) which is associated with the MeasObjectEUTRA. |
| *x-Reference-index*<br><br>Index of the cell/point/resource whose measured channel condition/path loss is used as the reference value in the triggering condition evaluation of the X-event (e.g., x1, x2, or x3) which is associated with the MeasObjectEUTRA. |
| *x-Reference-value*<br><br>The reference value which is used in the triggering condition evaluation of the X-event (e.g., x1, x2, or x3) which is associated with the MeasObjectEUTRA. The actual value may be a function of the IE value, e.g., IE value * 0.5 dB. If the field x-Reference-index is included in the IE, this field shall be neglected. |
| REF_MIN<br><br>The minimum value that can be taken by x-Reference-value. It may be replaced by actual numbers, too. |
| REF_MAX<br><br>The maximum value that can be taken by x-Reference-value. It may be replaced by actual numbers, too. |

| MeasObjectEUTRA field descriptions |
|---|
| _x-offsetFreq_ <br><br> _Offset value applicable to the carrier frequency in EUTRA measurement report triggering condition for the X-event (e.g., x1, x2, or x3) which is associated with the MeasObjectEUTRA. Value dB-24 corresponds to -24 dB, dB-22 corresponds to -22 dB and so on._ |
| physCellId <br><br> Physical cell identity of a cell in the cell list. |
| physCellIdRange <br><br> Physical cell identity or a range of physical cell identities of cells in the black list. |

......

*Modifications to MeasResults (in underlined italics)*

The same as in Example 1.1.

Example 2: Defining Event Triggers Y12 and Y3.

---

*Addition to Section 5.5.4*

*************************************************************************

5.5.4.y12    Event Y12 (Candidate becomes no worse than the Reference by an offset)

The UE shall:

> 1> consider the entering condition for this event to be satisfied when condition Y12-1, as specified below, is fulfilled;
>
> 1> consider the leaving condition for this event to be satisfied when condition Y12-2, as specified below, is fulfilled;
>
> NOTE    The Candidate that triggers the event is on the frequency (e.g., as indicated in the associated *measObject*) which may be different from the frequency used by the Reference.

Inequality Y12-1 (Entering condition)

$$Mc + Ofc + Opc + Hys < Mr + Ofr + Opr + Off$$

Inequality Y12-2 (Leaving condition)

$$Mc + Ofc + Opc - Hys > Mr + Ofr + Opr + Off$$

The variables in the formula are defined as follows:

*Mc* is the measurement result of the channel condition (e.g., path loss) of the candidate point/cell/resource, not taking into account any offsets.

*Ofc* is the frequency specific offset of the frequency of the candidate (e.g., *y12-offsetFreq* or *y-offsetFreq* as defined within *measObjectEUTRA* corresponding to the frequency of the candidate), and set to zero if not configured for the candidate.

*Opc* is the point/cell/resource specific offset of the candidate (e.g., *y12-pointIndividualOffset* or *y-pointIndividualOffset* as defined within *measObjectEUTRA* corresponding to the frequency of the candidate), and set to zero if not configured for the candidate.

*Mr* is the measurement result of channel condition (e.g., path loss) of the reference point/cell/resource, not taking into account any offsets.

*Ofr* is the frequency specific offset of the reference, (e.g., *y12-offsetFreq* or *y-offsetFreq* as defined within *measObjectEUTRA* corresponding to the frequency of the reference), and set to zero if not configured for the reference.

*Opr* is the point/cell/resource specific offset of the reference, (e.g., *y12-pointIndividualOffset* or *y-pointIndividualOffset* as defined within *measObjectEUTRA* corresponding to the frequency of the reference), and is set to zero if not configured for the reference.

*Hys* is the hysteresis parameter for this event.

*Off* is the offset parameter for this event (e.g., *y12-Offset* as defined within *reportConfigEUTRA* for this event).

*Mc, Mr* may be expressed in dB (e.g., if the channel condition is evaluated by path loss) or dBm (e.g., if the channel condition is evaluated by reference signal received power).

*Ofc, Opc, Ofr, Opr, Hys, Off* are expressed in dB.

Candidate is a point/cell/resource in the candidate list (e.g., *y12-Candidate-list* as defined within *reportConfigEUTRA* for this event, or *y-Candidate-list* as defined within *MeasObjectEUTRA* for this event).

Reference is a point/cell/resource the measured channel condition/path loss of which is used as the reference value in the comparison (e.g., *y12-Reference-index* as defined within *reportConfigEUTRA* for this event, or *y-Reference-index* as defined within *MeasObjectEUTRA* for this event), or a reference value which is used in the comparison (e.g., *y12-Reference-value* as defined within *reportConfigEUTRA* for this event, or *y-Reference-value* as defined within *MeasObjectEUTRA* for this event).

NOTE: In a preferred implementation of UL CoMP, a candidate may be configured/specified as a point/cell/resource which is in UL CoMP assessment set but not in UL CoMP cooperating set, and the reference may be configured/specified as the major reception point. If the offset parameter is set to a positive value, the triggering of the event may be used to suggest adding a point into UL CoMP cooperating set. In another preferred implementation of UL CoMP, a candidate may be configured/specified as a point/cell/resource which is in UL CoMP cooperating set but not the major reception point, and the reference may be configured/specified as the major reception point. If the offset parameter is set to a negative value, the triggering of the event may be used to suggest changing the major reception point.

5.5.4.y3     Event Y3 (Candidate becomes worse than the Reference by an offset)

The UE shall:

1> consider the entering condition for this event to be satisfied when condition Y3-1, as specified below, is fulfilled;

1> consider the leaving condition for this event to be satisfied when condition Y3-2, as specified below, is fulfilled;

NOTE   The Candidate that triggers the event is on the frequency (e.g., as indicated in the associated *measObject*) which may be different from the frequency used by the Reference.

Inequality Y3-1 (Entering condition)

$$Mc + Ofc + Opc - Hys > Mr + Ofr + Opr + Off$$

Inequality Y3-2 (Leaving condition)

$$Mc + Ofc + Opc + Hys < Mr + Ofr + Opr + Off$$

The variables in the formula are defined as follows:

*Mc* is the measurement result of the channel condition (e.g., path loss) of the candidate point/cell/resource, not taking into account any offsets.

*Ofc* is the frequency specific offset of the frequency of the candidate (e.g., *y3-offsetFreq* or *y-offsetFreq* as defined within *measObjectEUTRA* corresponding to the frequency of the candidate), and set to zero if not configured for the candidate.

*Opc* is the point/cell/resource specific offset of the candidate (e.g., *y3-pointIndividualOffset* or *y-pointIndividualOffset* as defined within *measObjectEUTRA* corresponding to the frequency of the candidate), and set to zero if not configured for the candidate.

*Mr* is the measurement result of channel condition (e.g., path loss) of the reference point/cell/resource, not taking into account any offsets.

*Ofr* is the frequency specific offset of the reference, (e.g., *y3-offsetFreq* or *y-offsetFreq* as defined within *measObjectEUTRA* corresponding to the frequency of the reference), and set to zero if not configured for the reference.

*Opr* is the point/cell/resource specific offset of the reference, (e.g., *y3-pointIndividualOffset* or *y-pointIndividualOffset* as defined within *measObjectEUTRA* corresponding to the frequency of the reference), and is set to zero if not configured for the reference.

*Hys* is the hysteresis parameter for this event.

*Off* is the offset parameter for this event (e.g., *y3-Offset* as defined within *reportConfigEUTRA* for this event).

*Mc, Mr* may be expressed in dB (e.g., if the channel condition is evaluated by path loss) or dBm (e.g., if the channel condition is evaluated by reference signal received power).

*Ofc, Opc, Ofr, Opr, Hys, Off* are expressed in dB.

*Candidate* is a point/cell/resource in the candidate list (e.g., *y3-Candidate-list* as defined within *reportConfigEUTRA* for this event, or *y-Candidate-list* as defined within *MeasObjectEUTRA* for this event).

*Reference* is a point/cell/resource the measured channel condition/path loss of which is used as the reference value in the comparison (e.g., *y3-Reference-index* as defined within *reportConfigEUTRA* for this event, or *y-Reference-index* as defined within *MeasObjectEUTRA* for this event), or a reference value which is used in the comparison (e.g., *y3-Reference-value* as defined within *reportConfigEUTRA* for this event, or *y-Reference-value* as defined within *MeasObjectEUTRA* for this event).

NOTE: In a preferred implementation of UL CoMP, a candidate may be configured/specified as a point/cell/resource which is in UL CoMP cooperating set, and the reference may be configured/specified as the major reception point. The offset parameter may be configured as a positive value. The triggering of the event may be used to suggest removing a point from UL CoMP cooperating set.

Note: *y12-offsetFreq* may have the same value as *y3-offsetFreq* for the same frequency, and *y12-pointIndividualOffset* may have the same value as *y3-pointIndividualOffset* for the same point/cell/resource.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

*Modifications to Section 6.3.5*

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

*Example 2.1:*

-- One measurement object (*MeasObjectEUTRA*) per frequency;

-- Lists of candidate cells/points/resources and the reference value (or reference cell/point/resource) are configured in reporting configurations(ReportConfigEUTRA) respectively.

*************************************************************************

*Modifications to ReportConfigEUTRA (in underlined italics)*

– *ReportConfigEUTRA*

The IE *ReportConfigEUTRA* specifies criteria for triggering of an E-UTRA measurement reporting event. The E-UTRA measurement reporting events are labeled A$N$ with $N$ equal to 1, 2 and so on, *or are labeled YN with N equal to 12, 3 and so on*.

Event A1: Serving becomes better than absolute threshold;

Event A2: Serving becomes worse than absolute threshold;

Event A3: Neighbour becomes amount of offset better than PCell;

Event A4: Neighbour becomes better than absolute threshold;

Event A5: PCell becomes worse than absolute threshold1 AND Neighbour becomes better than another absolute threshold2.

Event A6: Neighbour becomes amount of offset better than SCell.

*Event Y12: Candidate becomes no worse than the Reference by an offset.*

*Event Y3: Candidate becomes worse than the Reference by an offset.*

ReportConfigEUTRA information element

```
-- ASN1START

ReportConfigEUTRA ::=           SEQUENCE {
    triggerType                     CHOICE {
        event                           SEQUENCE {
            eventId                         CHOICE {
                eventA1                         SEQUENCE {
                    a1-Threshold                    ThresholdEUTRA
                },
                eventA2                         SEQUENCE {
                    a2-Threshold                    ThresholdEUTRA
                },
                eventA3                         SEQUENCE {
                    a3-Offset                       INTEGER (-30..30),
                    reportOnLeave                   BOOLEAN
                },
```

```
        eventA4                         SEQUENCE {
            a4-Threshold                    ThresholdEUTRA
        },
        eventA5                         SEQUENCE {
            a5-Threshold1                   ThresholdEUTRA,
            a5-Threshold2                   ThresholdEUTRA
        },
        ...,
        eventA6-r10                     SEQUENCE {
            a6-Offset-r10                   INTEGER (-30..30),
            a6-ReportOnLeave-r10            BOOLEAN
        },
        eventY12                        SEQUENCE {
            y12-Offset                      INTEGER (Y12_MIN..Y12_MAX),
            reportOnLeave                   BOOLEAN,
            y12-Candidate-list              CellIndexList           OPTIONAL,
            y12-Reference-index             CellIndex               OPTIONAL,
            y12-Reference-value             INTEGER (REF_MIN..REF_MAX) OPTIONAL
        },
        eventY3                         SEQUENCE {
            y3-Offset                       INTEGER (Y3_MIN..Y3_MAX),
            reportOnLeave                   BOOLEAN,
            y3-Candidate-list               CellIndexList           OPTIONAL,
            y3-Reference-index              CellIndex               OPTIONAL,
            y3-Reference-value              INTEGER (REF_MIN..REF_MAX) OPTIONAL
        }
    },
    hysteresis                      Hysteresis,
    timeToTrigger                   TimeToTrigger
  },
  periodical                      SEQUENCE {
    purpose                         ENUMERATED {
                                        reportStrongestCells, reportCGI}
    }
  },
  triggerQuantity                 ENUMERATED {rsrp, rsrq, cc-rsrp, cc-rsrq},
```

```
    reportQuantity                  ENUMERATED {sameAsTriggerQuantity, both},
    maxReportCells                  INTEGER (1..maxCellReport),
    reportInterval                  ReportInterval,
    reportAmount                    ENUMERATED {r1, r2, r4, r8, r16, r32, r64, infinity},
    ...,
    [[ si-RequestForHO-r9           ENUMERATED {setup}    OPTIONAL,   -- Cond reportCGI
       ue-RxTxTimeDiffPeriodical-r9 ENUMERATED {setup}    OPTIONAL    -- Need OR
    ]],
    [[ includeLocationInfo-r10      ENUMERATED {true}     OPTIONAL,   -- Cond reportMDT
       reportAddNeighMeas-r10       ENUMERATED {setup}    OPTIONAL    -- Need OR
    ]]
}

ThresholdEUTRA ::=              CHOICE{
    threshold-RSRP                  RSRP-Range,
    threshold-RSRQ                  RSRQ-Range,
    threshold-cc-RSRP               INTEGER (CC_RSRP_MIN..CC_RSRP_MAX),
    threshold-cc-RSRQ               INTEGER (CC_RSRQ_MIN..CC_RSRQ_MAX)
}

-- ASN1STOP
```

| ReportConfigEUTRA field descriptions |
|---|
| *a3-Offset/ a6-Offset* <br><br> Offset value to be used in EUTRA measurement report triggering condition for event a3/a6. The actual value is IE value * 0.5 dB. |
| *y12-Offset/y3-Offset* <br><br> Offset value to be used in EUTRA measurement report triggering condition for event y12/y3. The actual value may be a function of the IE value, e.g., IE value * 0.5 dB. |
| *Y12_MIN/Y3_MIN* <br><br> The minimum value that can be taken by y12-Offset/y3-Offset. It may be replaced by actual numbers, too. |
| *Y12_MAX/Y3_MAX* <br><br> The maximum value that can be taken by y12-Offset /y3-Offset. It may be replaced by actual numbers, too. |
| *y12-Candidate-list/ y3-Candidate-list* <br><br> List of cells/points/resources to be considered as candidate for the triggering of event y12/y3. |
| *y12-Reference-index/ y3- Reference-index* <br><br> Index of the cell/point/resource whose measured channel condition/path loss is used as the reference value in the triggering condition evaluation of event y12/y3. |

| ReportConfigEUTRA field descriptions |
|---|
| *y12-Reference-value/ y3- Reference-value* <br><br> The reference value which is used in the triggering condition evaluation of event y12/y3. The actual value may be a function of the IE value, e.g., IE value * 0.5 dB. If the field y12-Reference-index / y3- Reference-index is included in the IE, this field shall be neglected. |
| *REF_MIN* <br><br> The minimum value that can be taken by y12-Reference-value/ y3- Reference-value. It may be replaced by actual numbers, too. |
| *REF_MAX* <br><br> The maximum value that can be taken by y12-Reference-value/ y3- Reference-value. It may be replaced by actual numbers, too. |
| *aN-ThresholdM* <br><br> Threshold to be used in EUTRA measurement report triggering condition for event number aN. If multiple thresholds are defined for event number aN, the thresholds are differentiated by M. |
| *eventId* <br><br> Choice of E-UTRA event triggered reporting criteria. |
| *maxReportCells* <br><br> Max number of cells, excluding the serving cell, to include in the measurement report. |
| *reportAmount* <br><br> Number of measurement reports applicable for *triggerType event* as well as for *triggerType periodical*. In case *purpose* is set to *reportCGI* only value 1 applies. |

| ReportConfigEUTRA field descriptions |
| --- |
| reportOnLeave/ a6-ReportOnLeave<br><br>Indicates whether or not the UE shall initiate the measurement reporting procedure when the leaving condition is met for a cell in *cellsTriggeredList*, as specified in 5.5.4.1. |
| reportQuantity<br><br>The quantities to be included in the measurement report. The value both means that both the rsrp and rsrq quantities are to be included in the measurement report, *or both the cc-rsrp and cc-rsrq quantities are to be included in the measurement report*. |
| si-RequestForHO<br><br>The field applies to the *reportCGI* functionality, and when the field is included, the UE is allowed to use autonomous gaps in acquiring system information from the neighbour cell, applies a different value for T321, and includes different fields in the measurement report. |
| ThresholdEUTRA<br><br>For RSRP: RSRP based threshold for event evaluation. The actual value is IE value − 140 dBm.<br><br>For RSRQ: RSRQ based threshold for event evaluation. The actual value is (IE value − 40)/2 dB.<br><br>*For cc-RSRP: cc-RSRP based threshold for event evaluation.*<br><br>*For cc-RSRQ: cc-RSRQ based threshold for event evaluation.* |
| CC_RSRP_MIN/ CC_RSRQ_MIN<br><br>*The minimum value that can be taken by cc-RSRP/ cc-RSRQ. It may be replaced by actual numbers, too.* |

| ReportConfigEUTRA field descriptions |
|---|
| _CC_RSRP_MAX/ CC_RSRQ_MAX_ <br><br> _The maximum value that can be taken by cc-RSRP/ cc-RSRQ. It may be replaced by actual numbers, too._ |
| _timeToTrigger_ <br><br> Time during which specific criteria for the event needs to be met in order to trigger a measurement report. |
| _triggerQuantity_ <br><br> The quantities used to evaluate the triggering condition for the event. The values rsrp and rsrq correspond to Reference Signal Received Power (RSRP) and Reference Signal Received Quality (RSRQ), see TS 36.214 [48]. _The values cc-rsrp and cc-rsrq correspond to the channel conditions derived from RSRP and RSRQ measurements_. |
| _ue-RxTxTimeDiffPeriodical_ <br><br> If this field is present, the UE shall perform UE Rx-Tx time difference measurement reporting and ignore the fields _triggerQuantity_, _reportQuantity_ and _maxReportCells_. If the field is present, the only applicable values for the corresponding _triggerType_ and _purpose_ are periodical and reportStrongestCells respectively. |

......

*Modifications to MeasObjectEUTRA (in underlined italics)*

– *MeasObjectEUTRA*

The IE *MeasObjectEUTRA* specifies information applicable for intra-frequency or inter-frequency E-UTRA cells.

MeasObjectEUTRA information element

```
-- ASN1START

MeasObjectEUTRA ::=            SEQUENCE {
    carrierFreq                    ARFCN-ValueEUTRA,
    allowedMeasBandwidth           AllowedMeasBandwidth,
    presenceAntennaPort1           PresenceAntennaPort1,
    neighCellConfig                NeighCellConfig,
    offsetFreq                     Q-OffsetRange              DEFAULT dB0,
    y12-offsetFreq                 Q-OffsetRange              DEFAULT dB0,
    y3-offsetFreq                  Q-OffsetRange              DEFAULT dB0,
    -- Cell list
    cellsToRemoveList              CellIndexList              OPTIONAL,    -- Need ON
    cellsToAddModList              CellsToAddModList          OPTIONAL,    -- Need ON
    -- Black list
    blackCellsToRemoveList         CellIndexList              OPTIONAL,    -- Need ON
    blackCellsToAddModList         BlackCellsToAddModList     OPTIONAL,    -- Need ON
    cellForWhichToReportCGI        PhysCellId                 OPTIONAL,    -- Need ON
    ...,
    [[measCycleSCell-r10           MeasCycleSCell-r10         OPTIONAL,    -- Need ON
        measSubframePatternConfigNeigh-r10 MeasSubframePatternConfigNeigh-r10 OPTIONAL
            -- Need ON
    ]]
}

CellsToAddModList ::=          SEQUENCE (SIZE (1..maxCellMeas)) OF CellsToAddMod CellsToAddMod ::=   SEQUENCE {
    cellIndex                      INTEGER (1..maxCellMeas),
```

```
    physCellId                          PhysCellId,
    cellIndividualOffset                Q-OffsetRange,
    y12-pointIndividualOffset           Q-OffsetRange,
    y3-pointIndividualOffset            Q-OffsetRange
}

BlackCellsToAddModList ::=        SEQUENCE (SIZE (1..maxCellMeas)) OF BlackCellsToAddMod BlackCellsToAddMod ::= SEQUENCE {
    cellIndex                       INTEGER (1..maxCellMeas),
    physCellIdRange                 PhysCellIdRange
}

MeasCycleSCell-r10 ::=           ENUMERATED {sf160, sf256, sf320, sf512,
                                             sf640, sf1024, sf1280, spare1}

MeasSubframePatternConfigNeigh-r10 ::= CHOICE {
    release                         NULL,
    setup                           SEQUENCE {
        measSubframePatternNeigh-r10       MeasSubframePattern-r10,
        measSubframeCellList-r10           MeasSubframeCellList-r10    OPTIONAL     -- Cond
measSubframe
    }
}

MeasSubframeCellList-r10 ::=    SEQUENCE (SIZE (1..maxCellMeas)) OF PhysCellIdRange

-- ASN1STOP
```

| MeasObjectEUTRA field descriptions |
|---|
| blackCellsToAddMoList<br><br>List of cells to add/ modify in the black list of cells. |
| blackCellsToRemoveList<br><br>List of cells to remove from the black list of cells. |
| carrierFreq<br><br>Identifies E-UTRA carrier frequency for which this configuration is valid. |
| cellIndex<br><br>Entry index in the cell list. An entry may concern a range of cells, in which case this value applies to the entire range. |
| cellIndividualOffset<br><br>Cell individual offset applicable to a specific cell. Value dB-24 corresponds to -24 dB, dB-22 corresponds to -22 dB and so on. |
| <u>y12-pointIndividualOffset / y3-pointIndividualOffset</u><br><br><u>Point/cell/resource individual offset applicable to a specific point/cell/resource in EUTRA measurement report triggering condition for event y12/y3. Value dB-24 corresponds to -24 dB, dB-22 corresponds to -22 dB and so on.</u> |
| cellsToAddModList<br><br>List of cells to add/ modify in the cell list. |
| cellsToRemoveList<br><br>List of cells to remove from the cell list. |

| MeasObjectEUTRA field descriptions |
|---|
| measCycleSCell |
| Parameter: $T_{measure\_scc}$ See TS 36.133 [16, 8.3.3]. The parameter is used only when an SCell is configured on the frequency indicated by the *measObject* and is in deactivated state, but the field may also be signalled when an SCell is not configured. Value *sf160* corresponds to 160 sub-frames, *sf256* corresponds to 256 sub-frames and so on. |
| measSubframeCellList |
| List of cells for which *measSubframePatternNeigh* is applied. |
| measSubframePatternNeigh |
| Time domain measurement resource restriction pattern applicable to neighbour cell RSRP and RSRQ measurements on the carrier frequency indicated by *carrierFreq*. If MBSFN configuration of neighbour cells is unknown or not uniquely defined then for cells in *measSubframeCellList* the UE shall assume that the subframes indicated by *measSubframePatternNeigh* are non-MBSFN subframes. |
| offsetFreq |
| Offset value applicable to the carrier frequency. Value dB-24 corresponds to -24 dB, dB-22 corresponds to -22 dB and so on. |
| _y12-offsetFreq / y3-offsetFreq_ |
| *Offset value applicable to the carrier frequency in EUTRA measurement report triggering condition for event y12/y3. Value dB-24 corresponds to -24 dB, dB-22 corresponds to -22 dB and so on.* |
| physCellId |
| Physical cell identity of a cell in the cell list. |

| MeasObjectEUTRA field descriptions |
|---|
| physCellIdRange |
| Physical cell identity or a range of physical cell identities of cells in the black list. |

......

*Modifications to MeasResults (in underlined italics)*

- *MeasResults*

The IE *MeasResults* covers measured results for intra-frequency, inter-frequency and inter- RAT mobility.

MeasResults information element

```
-- ASN1START

MeasResults ::=                 SEQUENCE {
    measId                          MeasId,
    measResultPCell                 SEQUENCE {
        rsrpResult                      RSRP-Range,
        rsrqResult                      RSRQ-Range,
        cc-RSRPResult                   INTEGER (CC_RSRP_MIN..CC_RSRP_MAX),
        cc-RSRQResult                   INTEGER (CC_RSRQ_MIN..CC_RSRQ_MAX)
    },
    measResultNeighCells            CHOICE {
        measResultListEUTRA             MeasResultListEUTRA,
        measResultListUTRA              MeasResultListUTRA,
        measResultListGERAN             MeasResultListGERAN,
        measResultsCDMA2000             MeasResultsCDMA2000,
        ...
    }                                                                   OPTIONAL,
```

```
        ...,
    [[  measResultForECID-r9            MeasResultForECID-r9            OPTIONAL
    ]],
    [[  locationInfo-r10                LocationInfo-r10                OPTIONAL,
        measResultServFreqList-r10      MeasResultServFreqList-r10      OPTIONAL
    ]]
}

MeasResultListEUTRA ::=         SEQUENCE (SIZE (1..maxCellReport)) OF MeasResultEUTRA MeasResultEUTRA ::= SEQUENCE {
    physCellId                  PhysCellId,
    cgi-Info                    SEQUENCE {
        cellGlobalId                CellGlobalIdEUTRA,
        trackingAreaCode            TrackingAreaCode,
        plmn-IdentityList           PLMN-IdentityList2              OPTIONAL
    }                                                               OPTIONAL,
    measResult                  SEQUENCE {
        rsrpResult                  RSRP-Range                      OPTIONAL,
        rsrqResult                  RSRQ-Range                      OPTIONAL,
        cc-RSRPResult               INTEGER (CC_RSRP_MIN..CC_RSRP_MAX)  OPTIONAL,
        cc-RSRQResult               INTEGER (CC_RSRQ_MIN..CC_RSRQ_MAX)  OPTIONAL,
        ...,
        [[ additionalSI-Info-r9     AdditionalSI-Info-r9            OPTIONAL
        ]]
    }
}

MeasResultServFreqList-r10 ::=  SEQUENCE (SIZE (1..maxServCell-r10)) OF MeasResultServFreq-r10

MeasResultServFreq-r10 ::=      SEQUENCE {
    servFreqId-r10              ServCellIndex-r10,
    measResultSCell-r10         SEQUENCE {
        rsrpResultSCell-r10         RSRP-Range,
        rsrqResultSCell-r10         RSRQ-Range
    }                                                               OPTIONAL,
```

```
    measResultBestNeighCell-r10      SEQUENCE {
        physCellId-r10                   PhysCellId,
        rsrpResultNCell-r10              RSRP-Range,
        rsrqResultNCell-r10              RSRQ-Range
    }                                                                OPTIONAL,
    ...
}

MeasResultListUTRA ::=               SEQUENCE (SIZE (1..maxCellReport)) OF MeasResultUTRA MeasResultUTRA ::= SEQUENCE {
    physCellId                       CHOICE {
        fdd                              PhysCellIdUTRA-FDD,
        tdd                              PhysCellIdUTRA-TDD
    },
    cgi-Info                         SEQUENCE {
        cellGlobalId                     CellGlobalIdUTRA,
        locationAreaCode                 BIT STRING (SIZE (16))         OPTIONAL,
        routingAreaCode                  BIT STRING (SIZE (8))          OPTIONAL,
        plmn-IdentityList                PLMN-IdentityList2             OPTIONAL
    }                                                                OPTIONAL,
    measResult                       SEQUENCE {
        utra-RSCP                        INTEGER (-5..91)               OPTIONAL,
        utra-EcN0                        INTEGER (0..49)                OPTIONAL,
        ...,
        [[ additionalSI-Info-r9          AdditionalSI-Info-r9           OPTIONAL
        ]]
    }
}

MeasResultListGERAN ::=              SEQUENCE (SIZE (1..maxCellReport)) OF MeasResultGERAN MeasResultGERAN ::= SEQUENCE {
    carrierFreq                      CarrierFreqGERAN,
    physCellId                       PhysCellIdGERAN,
    cgi-Info                         SEQUENCE {
```

```
        cellGlobalId                    CellGlobalIdGERAN,
        routingAreaCode                 BIT STRING (SIZE (8))        OPTIONAL
    }                                                                OPTIONAL,
    measResult                          SEQUENCE {
        rssi                            INTEGER (0..63),
        ...
    }
}

MeasResultsCDMA2000 ::=                 SEQUENCE {
    preRegistrationStatusHRPD           BOOLEAN,
    measResultListCDMA2000              MeasResultListCDMA2000
}

MeasResultListCDMA2000 ::=              SEQUENCE (SIZE (1..maxCellReport)) OF MeasResultCDMA2000

MeasResultCDMA2000 ::=  SEQUENCE {
    physCellId                          PhysCellIdCDMA2000,
    cgi-Info                            CellGlobalIdCDMA2000         OPTIONAL,
    measResult                          SEQUENCE {
        pilotPnPhase                    INTEGER (0..32767)           OPTIONAL,
        pilotStrength                   INTEGER (0..63),
        ...
    }
}

MeasResultForECID-r9 ::=        SEQUENCE {
    ue-RxTxTimeDiffResult-r9            INTEGER (0..4095),
    currentSFN-r9                       BIT STRING (SIZE (10))
}

PLMN-IdentityList2 ::=                  SEQUENCE (SIZE (1..5)) OF PLMN-Identity

AdditionalSI-Info-r9 ::=                SEQUENCE {
    csg-MemberStatus-r9                 ENUMERATED {member}          OPTIONAL,
    csg-Identity-r9                     CSG-Identity                 OPTIONAL
```

| MeasResults field descriptions |
|---|
| csg-MemberStatus <br><br> Indicates whether or not the UE is a member of the CSG of the neighbour cell. |
| currentSFN <br><br> Indicates the current system frame number when receiving the UE Rx-Tx time difference measurement results from lower layer. |
| locationAreaCode <br><br> A fixed length code identifying the location area within a PLMN, as defined in TS 23.003 [27]. |
| measId <br><br> Identifies the measurement identity for which the reporting is being performed. |
| measResult <br><br> Measured result of an E-UTRA cell; <br><br> Measured result of a UTRA cell; <br><br> Measured result of a GERAN cell or frequency; or <br><br> Measured result of a CDMA2000 cell. <br><br> Measured result of UE Rx–Tx time difference. |
| measResultListCDMA2000 <br><br> List of measured results for the maximum number of reported best cells for a CDMA2000 measurement identity. |
| measResultListEUTRA <br><br> List of measured results for the maximum number of reported best cells for an E-UTRA measurement identity. |

| MeasResults field descriptions |
| --- |
| measResultListGERAN<br><br>List of measured results for the maximum number of reported best cells or frequencies for a GERAN measurement identity. |
| measResultListUTRA<br><br>List of measured results for the maximum number of reported best cells for a UTRA measurement identity. |
| measResultPCell<br><br>Measured result of the PCell. |
| measResultsCDMA2000<br><br>Contains the CDMA2000 HRPD pre-registration status and the list of CDMA2000 measurements. |

| MeasResults field descriptions |
|---|
| MeasResultServFreqList<br>Measured results of the serving frequencies: the measurement result of each SCell, if any, and of the best neighbouring cell on each serving frequency. |
| pilotPnPhase<br>Indicates the arrival time of a CDMA2000 pilot, measured relative to the UE's time reference in units of PN chips, see C.S0005-A [25]. This information is used in either SRVCC handover or enhanced 1xRTT CS fallback procedure to CDMA2000 1xRTT. |
| pilotStrength<br>CDMA2000 Pilot Strength, the ratio of pilot power to total power in the signal bandwidth of a CDMA2000 Forward Channel. See C.S0005-A [25] for CDMA2000 1xRTT and C.S0024-A [26] for CDMA2000 HRPD. |
| plmn-IdentityList<br>The list of PLMN Identity read from broadcast information when the multiple PLMN Identities are broadcast. This field contains the list of identities starting from the second entry of PLMN Identities in the broadcast information. |
| preRegistrationStatusHRPD<br>Set to TRUE if the UE is currently pre-registered with CDMA2000 HRPD. Otherwise set to FALSE. This can be ignored by the eNB for CDMA2000 1xRTT. |

| MeasResults field descriptions |
|---|
| routingAreaCode<br><br>The RAC identity read from broadcast information, as defined in TS 23.003 [27]. |
| rsrpResult<br><br>Measured RSRP result of an E-UTRA cell.<br><br>The rsrpResult is only reported if configured by the eNB. |
| rsrqResult<br><br>Measured RSRQ result of an E-UTRA cell.<br><br>The rsrqResult is only reported if configured by the eNB. |
| *cc-rsrpResult*<br><br>*Measured/derived cc-RSRP result of an E-UTRA cell.*<br><br>*The cc-rsrpResult is only reported if configured by the eNB.* |
| *cc-rsrqResult*<br><br>*Measured/derived cc-RSRQ result of an E-UTRA cell.*<br><br>*The cc-rsrqResult is only reported if configured by the eNB.* |
| rssi<br><br>GERAN Carrier RSSI. RXLEV is mapped to a value between 0 and 63, TS 45.008 [28]. When mapping the RXLEV value to the RSSI bit string, the first/leftmost bit of the bit string contains the most significant bit. |
| ue-RxTxTimeDiffResult<br><br>UE Rx-Tx time difference measurement result of the PCell, provided by lower layers.<br><br>According to UE Rx-Tx time difference report mapping in TS 36.133 [16]. |

| MeasResults field descriptions |
|---|
| *utra-EcN0*<br>According to CPICH_Ec/No in TS 25.133 [29] for FDD. Fourteen spare values. The field is not present for TDD. |
| *utra-RSCP*<br>According to CPICH_RSCP in TS 25.133 [29] for FDD and P-CCPCH_RSCP in TS 25.123 [30] for TDD. Thirty-one spare values. |

......

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

*Example 2.2:*

-- Multiple measurement objects (MeasObjectEUTRA) per frequency;

-- Lists of candidate cells/points/resources and the reference value (or reference cell/point/resource) are configured in measurement objects (MeasObjectEUTRA) respectively.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Modifications to ReportConfigEUTRA *(in underlined italics)*

–     *ReportConfigEUTRA*

The IE *ReportConfigEUTRA* specifies criteria for triggering of an E-UTRA measurement reporting event. The E-UTRA measurement reporting events are labelled A*N* with *N* equal to 1, 2 and so on, <u>*or are labeled YN with N equal to 12, 3 and so on*</u>.

Event A1: Serving becomes better than absolute threshold;

Event A2: Serving becomes worse than absolute threshold;

Event A3: Neighbour becomes amount of offset better than PCell;

Event A4: Neighbour becomes better than absolute threshold;

Event A5: PCell becomes worse than absolute threshold1 AND Neighbour becomes better than another absolute threshold2.

Event A6: Neighbour becomes amount of offset better than SCell.

*Event Y12: Candidate becomes no worse than the Reference by an offset.*

*Event Y3: Candidate becomes worse than the Reference by an offset.*

ReportConfigEUTRA information element

```
-- ASN1START

ReportConfigEUTRA ::=          SEQUENCE {
    triggerType                    CHOICE {
        event                          SEQUENCE {
            eventId                        CHOICE {
                eventA1                        SEQUENCE {
                    a1-Threshold                   ThresholdEUTRA
                },
                eventA2                        SEQUENCE {
                    a2-Threshold                   ThresholdEUTRA
                },
                eventA3                        SEQUENCE {
                    a3-Offset                      INTEGER (-30..30),
                    reportOnLeave                  BOOLEAN
                },
```

```
        eventA4                    SEQUENCE {
            a4-Threshold               ThresholdEUTRA
        },
        eventA5                    SEQUENCE {
            a5-Threshold1              ThresholdEUTRA,
            a5-Threshold2              ThresholdEUTRA
        },
        ...,
        eventA6-r10                SEQUENCE {
            a6-Offset-r10              INTEGER (-30..30),
            a6-ReportOnLeave-r10       BOOLEAN
        },
        eventY12                   SEQUENCE {
            y12-Offset                 INTEGER (Y12_MIN..Y12_MAX),
            reportOnLeave              BOOLEAN
        },
        eventY3                    SEQUENCE {
            y3-Offset                  INTEGER (Y3_MIN..Y3_MAX),
            reportOnLeave              BOOLEAN
        }
    },
    hysteresis                 Hysteresis,
    timeToTrigger              TimeToTrigger
},
periodical                  SEQUENCE {
    purpose                    ENUMERATED {
                                   reportStrongestCells, reportCGI}
    }
},
triggerQuantity             ENUMERATED {rsrp, rsrq, cc-rsrp, cc-rsrq},
reportQuantity              ENUMERATED {sameAsTriggerQuantity, both},
maxReportCells              INTEGER (1..maxCellReport),
reportInterval              ReportInterval,
reportAmount                ENUMERATED {r1, r2, r4, r8, r16, r32, r64, infinity},
...,
[[ si-RequestForHO-r9        ENUMERATED {setup}    OPTIONAL,   -- Cond reportCGI
```

```
        ue-RxTxTimeDiffPeriodical-r9    ENUMERATED {setup}    OPTIONAL    -- Need OR
    ]],
    [[  includeLocationInfo-r10         ENUMERATED {true}     OPTIONAL,   -- Cond reportMDT
        reportAddNeighMeas-r10          ENUMERATED {setup}    OPTIONAL    -- Need OR
    ]]
}

ThresholdEUTRA ::=                  CHOICE{
    threshold-RSRP                  RSRP-Range,
    threshold-RSRQ                  RSRQ-Range,
    threshold-cc-RSRP               INTEGER (CC_RSRP_MIN..CC_RSRP_MAX),
    threshold-cc-RSRQ               INTEGER (CC_RSRQ_MIN..CC_RSRQ_MAX)
}

-- ASN1STOP
```

| ReportConfigEUTRA field descriptions |
|---|
| a3-Offset/ a6-Offset<br>Offset value to be used in EUTRA measurement report triggering condition for event a3/a6. The actual value is IE value * 0.5 dB. |
| y12-Offset / y3-Offset<br>Offset value to be used in EUTRA measurement report triggering condition for event y12/y3. The actual value may be a function of the IE value, e.g., IE value * 0.5 dB. |
| Y12_MIN/Y3_MIN<br>The minimum value that can be taken by y12-Offset/y3-Offset. It may be replaced by actual numbers, too. |
| Y12_MAX/Y3_MAX<br>The maximum value that can be taken by y12-Offset/y3-Offset. It may be replaced by actual numbers, too. |
| aN-ThresholdM<br>Threshold to be used in EUTRA measurement report triggering condition for event number aN. If multiple thresholds are defined for event number aN, the thresholds are differentiated by M. |
| eventId<br>Choice of E-UTRA event triggered reporting criteria. |
| maxReportCells<br>Max number of cells, excluding the serving cell, to include in the measurement report. |

| ReportConfigEUTRA field descriptions |
|---|
| reportAmount |
| Number of measurement reports applicable for *triggerType event* as well as for *triggerType periodical*. In case *purpose* is set to *reportCGI* only value 1 applies. |
| reportOnLeave/ a6-ReportOnLeave |
| Indicates whether or not the UE shall initiate the measurement reporting procedure when the leaving condition is met for a cell in *cellsTriggeredList*, as specified in 5.5.4.1. |
| reportQuantity |
| The quantities to be included in the measurement report. The value both means that both the rsrp and rsrq quantities are to be included in the measurement report, _or both the cc-rsrp and cc-rsrq quantities are to be included in the measurement report_. |
| si-RequestForHO |
| The field applies to the *reportCGI* functionality, and when the field is included, the UE is allowed to use autonomous gaps in acquiring system information from the neighbour cell, applies a different value for T321, and includes different fields in the measurement report. |
| ThresholdEUTRA |
| For RSRP: RSRP based threshold for event evaluation. The actual value is IE value − 140 dBm. |
| For RSRQ: RSRQ based threshold for event evaluation. The actual value is (IE value − 40)/2 dB. |
| _For cc-RSRP: cc-RSRP based threshold for event evaluation._ |
| _For cc-RSRQ: cc-RSRQ based threshold for event evaluation._ |

| ReportConfigEUTRA field descriptions |
|---|
| *CC_RSRP_MIN/ CC_RSRQ_MIN*<br><br>The minimum value that can be taken by cc-RSRP/ cc-RSRQ. It may be replaced by actual numbers, too. |
| *CC_RSRP_MAX/ CC_RSRQ_MAX*<br><br>The maximum value that can be taken by cc-RSRP/ cc-RSRQ. It may be replaced by actual numbers, too. |
| *timeToTrigger*<br><br>Time during which specific criteria for the event needs to be met in order to trigger a measurement report. |
| *triggerQuantity*<br><br>The quantities used to evaluate the triggering condition for the event. The values rsrp and rsrq correspond to Reference Signal Received Power (RSRP) and Reference Signal Received Quality (RSRQ), see TS 36.214 [48]. *The values cc-rsrp and cc-rsrq correspond to the channel conditions derived from RSRP and RSRQ measurements.* |
| *ue-RxTxTimeDiffPeriodical*<br><br>If this field is present, the UE shall perform UE Rx-Tx time difference measurement reporting and ignore the fields *triggerQuantity*, *reportQuantity* and *maxReportCells*. If the field is present, the only applicable values for the corresponding *triggerType* and *purpose* are periodical and reportStrongestCells respectively. |

……

*Modifications to* MeasObjectEUTRA *(in underlined italics)*

– *MeasObjectEUTRA*

The IE *MeasObjectEUTRA* specifies information applicable for intra-frequency or inter-frequency E-UTRA cells.

*MeasObjectEUTRA* information element

```
-- ASN1START

MeasObjectEUTRA ::=            SEQUENCE {
    carrierFreq                ARFCN-ValueEUTRA,
    allowedMeasBandwidth       AllowedMeasBandwidth,
    presenceAntennaPort1       PresenceAntennaPort1,
    neighCellConfig            NeighCellConfig,
    offsetFreq                 Q-OffsetRange              DEFAULT dB0,
    y-offsetFreq               Q-OffsetRange              DEFAULT dB0,
    -- Cell list
    cellsToRemoveList          CellIndexList              OPTIONAL,     -- Need ON
    cellsToAddModList          CellsToAddModList          OPTIONAL,     -- Need ON
    y-Candidate-list           CellIndexList              OPTIONAL,
    y-Reference-index          CellIndex                  OPTIONAL,
    y-Reference-value          INTEGER (REF_MIN..REF_MAX) OPTIONAL,
    -- Black list
    blackCellsToRemoveList     CellIndexList              OPTIONAL,     -- Need ON
    blackCellsToAddModList     BlackCellsToAddModList     OPTIONAL,     -- Need ON
    cellForWhichToReportCGI    PhysCellId                 OPTIONAL,     -- Need ON
    ...,
    [[measCycleSCell-r10       MeasCycleSCell-r10         OPTIONAL,     -- Need ON
        measSubframePatternConfigNeigh-r10  MeasSubframePatternConfigNeigh-r10  OPTIONAL
            -- Need ON
    ]]
}

CellsToAddModList ::=          SEQUENCE (SIZE (1..maxCellMeas)) OF CellsToAddMod
```

```
CellsToAddMod ::=    SEQUENCE {
    cellIndex                   INTEGER (1..maxCellMeas),
    physCellId                  PhysCellId,
    cellIndividualOffset        Q-OffsetRange,
    y-pointIndividualOffset     Q-OffsetRange
}

BlackCellsToAddModList ::=     SEQUENCE (SIZE (1..maxCellMeas)) OF BlackCellsToAddMod BlackCellsToAddMod ::=  SEQUENCE {
    cellIndex                   INTEGER (1..maxCellMeas),
    physCellIdRange             PhysCellIdRange
}

MeasCycleSCell-r10 ::=          ENUMERATED {sf160, sf256, sf320, sf512,
                                            sf640, sf1024, sf1280, spare1}

MeasSubframePatternConfigNeigh-r10 ::=  CHOICE {
    release                     NULL,
    setup                       SEQUENCE {
        measSubframePatternNeigh-r10       MeasSubframePattern-r10,
        measSubframeCellList-r10           MeasSubframeCellList-r10     OPTIONAL    -- Cond
measSubframe
    }
}

MeasSubframeCellList-r10 ::=    SEQUENCE (SIZE (1..maxCellMeas)) OF PhysCellIdRange

-- ASN1STOP
```

| MeasObjectEUTRA field descriptions |
|---|
| blackCellsToAddMoList |
| List of cells to add/ modify in the black list of cells. |
| blackCellsToRemoveList |
| List of cells to remove from the black list of cells. |
| carrierFreq |
| Identifies E-UTRA carrier frequency for which this configuration is valid. |
| cellIndex |
| Entry index in the cell list. An entry may concern a range of cells, in which case this value applies to the entire range. |
| cellIndividualOffset |
| Cell individual offset applicable to a specific cell. Value dB-24 corresponds to -24 dB, dB-22 corresponds to -22 dB and so on. |
| *y-pointIndividualOffset* |
| *Point/cell/resource individual offset applicable to a specific point/cell/resource in EUTRA measurement report triggering condition for the Y-event (e.g., y12, or y3) which is associated with the MeasObjectEUTRA. Value dB-24 corresponds to -24 dB, dB-22 corresponds to -22 dB and so on.* |
| cellsToAddModList |
| List of cells to add/ modify in the cell list. |
| cellsToRemoveList |
| List of cells to remove from the cell list. |

| MeasObjectEUTRA field descriptions |
|---|
| _y-Candidate-list_<br>List of cells/points/resources to be considered as candidate for the triggering of the Y-event (e.g., y12, or y3) which is associated with the MeasObjectEUTRA. |
| _y-Reference-index_<br>Index of the cell/point/resource whose measured channel condition/path loss is used as the reference value in the triggering condition evaluation of the Y-event (e.g., y12, or y3) which is associated with the MeasObjectEUTRA. |
| _y-Reference-value_<br>The reference value which is used in the triggering condition evaluation of the Y-event (e.g., y12, or y3) which is associated with the MeasObjectEUTRA. The actual value may be a function of the IE value, e.g., IE value * 0.5 dB. If the field x-Reference-index is included in the IE, this field shall be neglected. |
| _REF_MIN_<br>The minimum value that can be taken by y-Reference-value. It may be replaced by actual numbers, too. |
| _REF_MAX_<br>The maximum value that can be taken by y-Reference-value. It may be replaced by actual numbers, too. |

| MeasObjectEUTRA field descriptions |
|---|
| *y-offsetFreq*<br><br>*Offset value applicable to the carrier frequency in EUTRA measurement report triggering condition for the Y-event (e.g., y12, or y3) which is associated with the MeasObjectEUTRA. Value dB-24 corresponds to -24 dB, dB-22 corresponds to -22 dB and so on.* |
| physCellId<br><br>Physical cell identity of a cell in the cell list. |
| physCellIdRange<br><br>Physical cell identity or a range of physical cell identities of cells in the black list. |

......

*Modifications to MeasResults (in underlined italics)*

The same as in Example 2.1.

What is claimed is:

1. A method comprising:
   receiving, by a transmission point, an initial configuration identifying a group of assessment devices;
   determining, by the transmission point, a channel condition for each communications channel between one of the assessment devices and the transmission point, wherein the determining comprises:
      measuring, by the transmission point, a received signal strength for a signal transmitted by the assessment device;
      obtaining, by the transmission point from another network entity other than the transmission point, a transmit power level of the signal transmitted by the assessment device; and
      setting, by the transmission point, the channel condition for the communications channel to a difference between the transmit power level of the signal and the received signal strength of the signal;
   comparing, by the transmission point, each of the channel conditions with a first threshold;
   transmitting, by the transmission point, a report to a network entity in response to at least one of the channel conditions meeting the first threshold; and
   transmitting, by the transmission point, an uplink CoMP transmission to a group of uplink coordinated multiple point (CoMP) receiving devices grouped in accordance with the report, for multiple point reception and reconstruction of the uplink CoMP transmission from the transmission point to the group of uplink CoMP receiving devices.

2. The method of claim 1, wherein the initial configuration comprises an event trigger in accordance with the first threshold.

3. The method of claim 2, wherein the initial configuration further comprises the first threshold.

4. The method of claim 1, wherein the initial configuration is received in a radio resource control message.

5. The method of claim 1, further comprising receiving an updated configuration.

6. The method of claim 5, wherein the updated configuration identifies an updated group of assessment devices.

7. The method of claim 5, wherein the update configuration is received in a radio resource control message.

8. The method of claim 1, wherein the group of assessment devices comprises a group of cooperating devices.

9. The method of claim 1, further comprising obtaining the transmit power level of the signal from a message containing transmit power level information.

10. The method of claim 1, further comprising obtaining the transmit power level of the signal from a configuration parameter provided in the initial configuration.

11. The method of claim 1, wherein the received signal strength and the transmit power level are for a first unidirectional channel between one of the assessment devices and the transmission point, wherein the channel condition is for a second unidirectional channel between the transmission point and one of the assessment devices, and wherein the first unidirectional channel is a downlink channel and the second unidirectional channel is an uplink channel.

12. The method of claim 1, wherein the report comprises the channel conditions and identity information of assessment devices.

13. The method of claim 1, wherein the report comprises the at least one of the channel conditions that meet the first threshold and identity information of assessment devices associated with the at least one of the channel conditions.

14. The method of claim 1, wherein the report is transmitted in a radio resource control message.

15. The method of claim 1, wherein the first threshold comprises a reference channel condition.

16. The method of claim 15, wherein the reference channel condition comprises a major channel condition of a major channel between the transmission point and a major point.

17. The method of claim 1, wherein the first threshold comprises a reference channel condition and a second threshold.

18. A method for configuring a group of uplink coordinated multiple point (CoMP) receiving devices for a transmission point, the method comprising:
   transmitting, by a network entity, an initial configuration identifying a group of assessment devices to the transmission point, the group of assessment devices having a different membership than the group of uplink CoMP receiving devices;
   receiving, by the network entity, a report from the transmission point, the report comprising a channel condition for at least one of the assessment devices in the group of assessment devices; and
   adjusting, by the network entity, a membership of the group of uplink CoMP receiving devices for the transmission point in accordance with the report to produce an updated group of uplink CoMP receiving devices for multiple point reception and reconstruction of an uplink CoMP transmission from the transmission point to the updated group of uplink CoMP receiving devices.

19. The method of claim 18, wherein the group of uplink CoMP receiving devices comprises at least one of a coordinated multiple point cooperating set or a coordinated multiple point major point.

20. The method of claim 18, further comprising:
   adjusting a membership of the group of assessment devices in accordance with the report to produce an updated group of assessment devices; and
   transmitting an updated configuration identifying the updated group of assessment devices to the transmission point.

21. The method of claim 18, further comprising transmitting a reference signal at a transmit power level.

22. The method of claim 18, wherein the report is received in a radio resource control message.

23. A method for configuring a group of uplink coordinated multiple point (CoMP) receiving devices for a transmission point, the method comprising:
   determining, by a network entity, a first channel condition for a first communications channel between a first assessment device and the transmission point, wherein the first channel condition is determined in accordance with a reference signal transmitted by the transmission point;
   receiving, by the network entity, a second channel condition from a second assessment device for a second communications channel between the second assessment device and the transmission point, wherein the second channel condition is determined in accordance with the reference signal transmitted by the transmission point, and wherein the second assessment device is not a member of the group of uplink CoMP receiving devices; and
   adjusting, by the network entity, a membership of the group of uplink CoMP receiving devices for the transmission point in accordance with the first channel condition and the second channel condition to produce an updated group of uplink CoMP receiving devices for multiple point reception and reconstruction of an uplink CoMP transmission from the transmission point to the updated group of uplink CoMP receiving devices.

24. The method of claim 23, wherein determining the first channel condition comprises receiving the first channel condition from the first assessment device.

25. The method of claim 24, further comprising specifying one of a time interval, a time event, or a request event for receiving the first channel condition and the second channel condition.

26. The method of claim 23, wherein the network entity is the first assessment device.

27. The method of claim 26, further comprising transmitting an initial configuration to the transmission point, the initial configuration specifying transmission parameters for the reference signal.

28. The method of claim 27, wherein the transmission parameters comprise at least one of a transmit power level for the reference signal, a periodicity of transmissions of the reference signal, or resource information for transmitting the reference signal.

29. The method of claim 26, wherein determining the first channel condition comprises measuring the first channel condition in accordance with the reference signal transmitted by the transmission point.

30. The method of claim 23, further comprising adjusting a membership of a group of assessment devices in accordance with the first channel condition and the second channel condition to produce an updated group of assessment devices.

31. The method of claim 23, wherein the reference signal is a sounding reference signal.

32. A transmission point comprising:
a receiver of the transmission point configured to receive an initial configuration identifying a group of assessment devices;
a processor of the transmission point operatively coupled to the receiver, the processor configured to:
determine a channel condition for each communications channel between one of the assessment devices in the group of assessment devices and the transmission point, wherein the processor configured to determine comprises the processor of the transmission point configured to:
measure a received signal strength for a signal transmitted by the assessment device,
obtain, from another network entity other than the transmission point, a transmit power level of the signal transmitted by the assessment device, and
set the channel condition for the communications channel to a difference between the transmit power level of the signal and the received signal strength of the signal; and
compare each of the channel conditions with a first threshold; and
a transmitter of the transmission point operatively coupled to the processor, the transmitter configured to:
transmit a report to a network entity in response to at least one of the channel conditions meeting the first threshold; and
transmit an uplink CoMP transmission to a group of uplink coordinated multiple point (CoMP) receiving devices grouped in accordance with the report, for multiple point reception and reconstruction of the uplink CoMP transmission from the transmission point to the group of uplink CoMP receiving devices.

33. The transmission point of claim 32, wherein the receiver is configured to receive an updated configuration.

34. The transmission point of claim 33, wherein the updated configuration identifies an updated group of assessment devices.

35. The transmission point of claim 32, wherein the transmitter is configured to transmit the report in a radio resource control message.

36. A network entity comprising:
a transmitter configured to transmit an initial configuration identifying a group of assessment devices to a transmission point, the group of assessment devices having a different membership than a group of uplink coordinated multiple point (CoMP) receiving devices;
a receiver configured to receive a report from the transmission point, the report comprising a channel condition for at least one of the assessment devices in the group of assessment devices; and
a processor operatively coupled to the transmitter and to the receiver, the processor configured to adjust a membership of the group of uplink CoMP receiving devices for the transmission point in accordance with the report to produce an updated group of uplink CoMP receiving devices for multiple point reception and reconstruction of an uplink CoMP transmission from the transmission point to the updated group of uplink CoMP receiving devices.

37. The network entity of claim 36, wherein the processor is configured to adjust a membership of the group of assessment devices in accordance with the report to produce an updated group of assessment devices, and wherein the transmitter is configured to transmit an update configuration identifying the updated group of assessment devices to the transmission point.

38. The network entity of claim 36, wherein the transmitter is configured to transmit a reference signal at a transmit power level.

* * * * *